US012567247B2

(12) United States Patent
Zhang

(10) Patent No.: US 12,567,247 B2
(45) Date of Patent: Mar. 3, 2026

(54) IMAGE ABNORMALITY DETECTION MODEL TRAINING

(71) Applicant: Tencent Technology (Shenzhen) Company Limited, Shenzhen (CN)

(72) Inventor: Boshen Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 335 days.

(21) Appl. No.: 18/141,011

(22) Filed: Apr. 28, 2023

(65) Prior Publication Data

US 2023/0267730 A1     Aug. 24, 2023

Related U.S. Application Data

(63) Continuation of application No. PCT/CN2022/110998, filed on Aug. 9, 2022.

(30) Foreign Application Priority Data

Sep. 15, 2021     (CN) .......................... 202111079651.0

(51) Int. Cl.
*G06V 10/00* (2022.01)
*G06V 10/82* (2022.01)
*G06V 10/98* (2022.01)

(52) U.S. Cl.
CPC ............ *G06V 10/993* (2022.01); *G06V 10/82* (2022.01)

(58) Field of Classification Search
CPC .... G06V 10/993; G06V 10/82; G06V 10/774; G06V 10/764; G06V 10/776; G06N 3/04; G06N 3/08
See application file for complete search history.

(56) References Cited

U.S. PATENT DOCUMENTS

2021/0343012 A1* 11/2021 Xiao ......................... G06T 7/90

FOREIGN PATENT DOCUMENTS

CN     110163234 A * 8/2019 ........... G06F 18/214
CN     110866908 A * 3/2020 ........... G06F 18/214
(Continued)

OTHER PUBLICATIONS

Qin et al, Making Deep Neural Networks Robust to Label Noise: Cross-Training With a Novel Loss Function, IEEE Access, vol. 7, pp. 130893-130901 (Year: 2019).*
(Continued)

*Primary Examiner* — Xiao Liu
(74) *Attorney, Agent, or Firm* — ArentFox Schiff LLP

(57) ABSTRACT

An image abnormality detection model training method includes acquiring a noise-containing training label as a current mapping label of a training image input into an initial image abnormality detection model to obtain a prediction label. The method further includes generating model feedback data based on the current mapping label and the prediction label, generating a label loss based on a data change of the model feedback data, and adjusting the current mapping label based on the label loss. The method also includes adjusting model parameters of the initial image abnormality detection model based on the model feedback data, and iteratively performing the inputting the training image, the generating the model feedback data, the generating the label loss, and the adjusting the model parameters until a training end condition is satisfied to obtain a trained image abnormality detection model.

19 Claims, 7 Drawing Sheets

(56)         References Cited

FOREIGN PATENT DOCUMENTS

| CN | 112766244 | A | 5/2021 |
| CN | 114332578 | A | 4/2022 |

OTHER PUBLICATIONS

International Search Report and Written Opinion received for PCT Patent Application No. PCT/CN22/110998, mailed on Oct. 24, 2022, 14 pages.

Office Action received for Chinese Patent Application No. 202111079651.0, mailed on Mar. 4, 2025, 21 pages (11 pages of English Translation and 10 pages of Original Document).

* cited by examiner

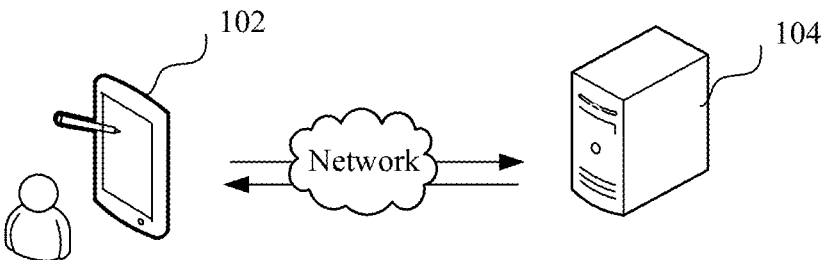

FIG. 1

Acquire an initial mapping label corresponding to a training label, and take the initial mapping label as a current mapping label

Input a training image in a current training image set into an initial image abnormality detection model to obtain a target prediction label corresponding to the training image

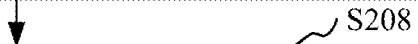

Generate model feedback data based on the current mapping label corresponding to the training label and the target prediction label of the training image

Generate a label loss based on data change reference information corresponding to the model feedback data, adjust the current mapping label based on the label loss to obtain an updated mapping label, and take the updated mapping label as the current mapping label

S210

Adjust model parameters of the initial image abnormality detection model based on the model feedback data to obtain an updated image abnormality detection model, take the updated image abnormality detection model as the initial image abnormality detection model, acquire a next training image set as the current training image set, and return to perform the step of inputting a training image in a current training image set into an initial image abnormality detection model until a training end condition is satisfied to obtain a target image abnormality detection model

Figure 3:
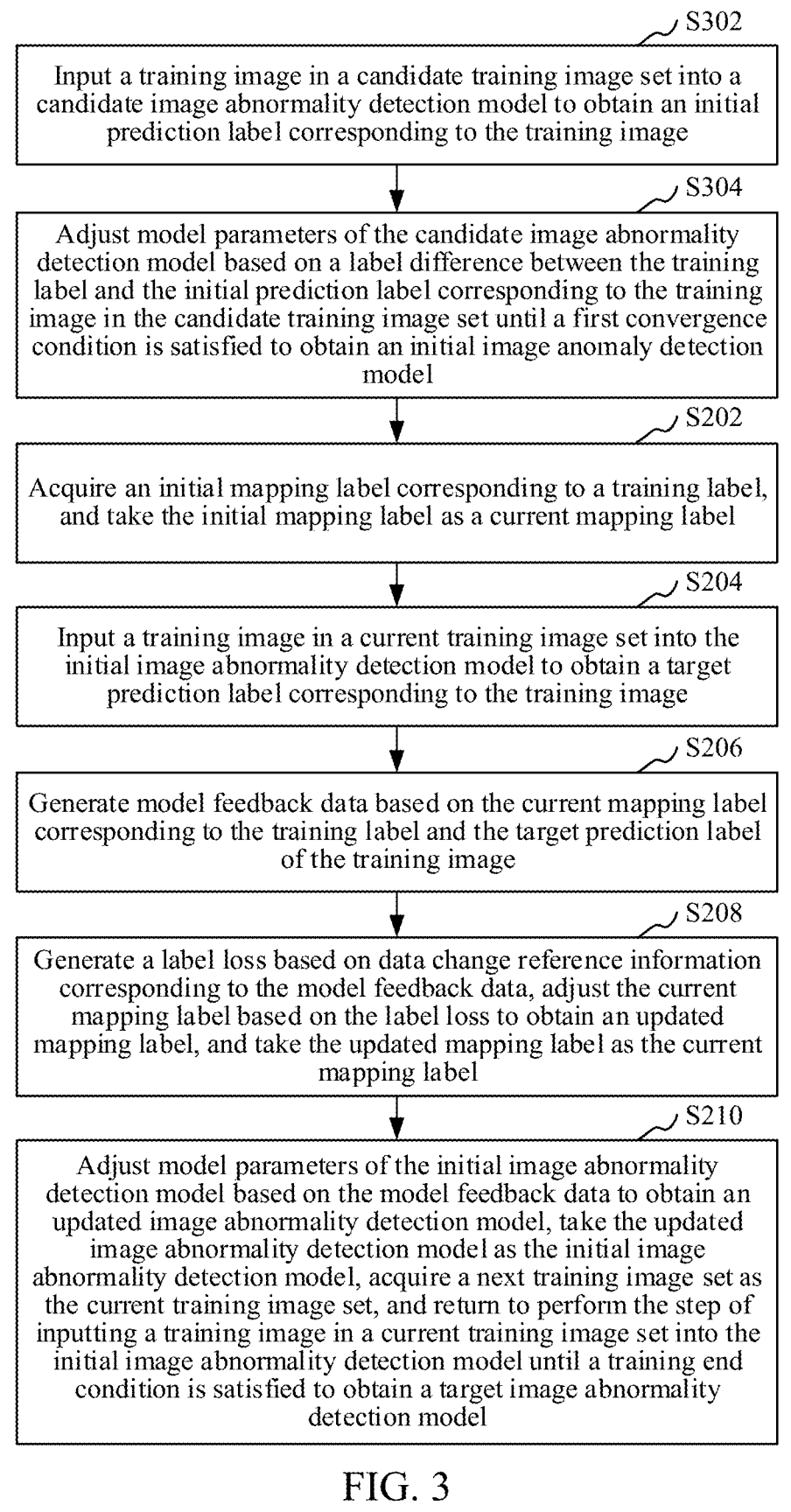

Input a training image in a candidate training image set into a candidate image abnormality detection model to obtain an initial prediction label corresponding to the training image

S304

Adjust model parameters of the candidate image abnormality detection model based on a label difference between the training label and the initial prediction label corresponding to the training image in the candidate training image set until a first convergence condition is satisfied to obtain an initial image anomaly detection model

S202

Acquire an initial mapping label corresponding to a training label, and take the initial mapping label as a current mapping label

S204

Input a training image in a current training image set into the initial image abnormality detection model to obtain a target prediction label corresponding to the training image

S206

Generate model feedback data based on the current mapping label corresponding to the training label and the target prediction label of the training image

S208

Generate a label loss based on data change reference information corresponding to the model feedback data, adjust the current mapping label based on the label loss to obtain an updated mapping label, and take the updated mapping label as the current mapping label

S210

Adjust model parameters of the initial image abnormality detection model based on the model feedback data to obtain an updated image abnormality detection model, take the updated image abnormality detection model as the initial image abnormality detection model, acquire a next training image set as the current training image set, and return to perform the step of inputting a training image in a current training image set into the initial image abnormality detection model until a training end condition is satisfied to obtain a target image abnormality detection model

Figure 4:
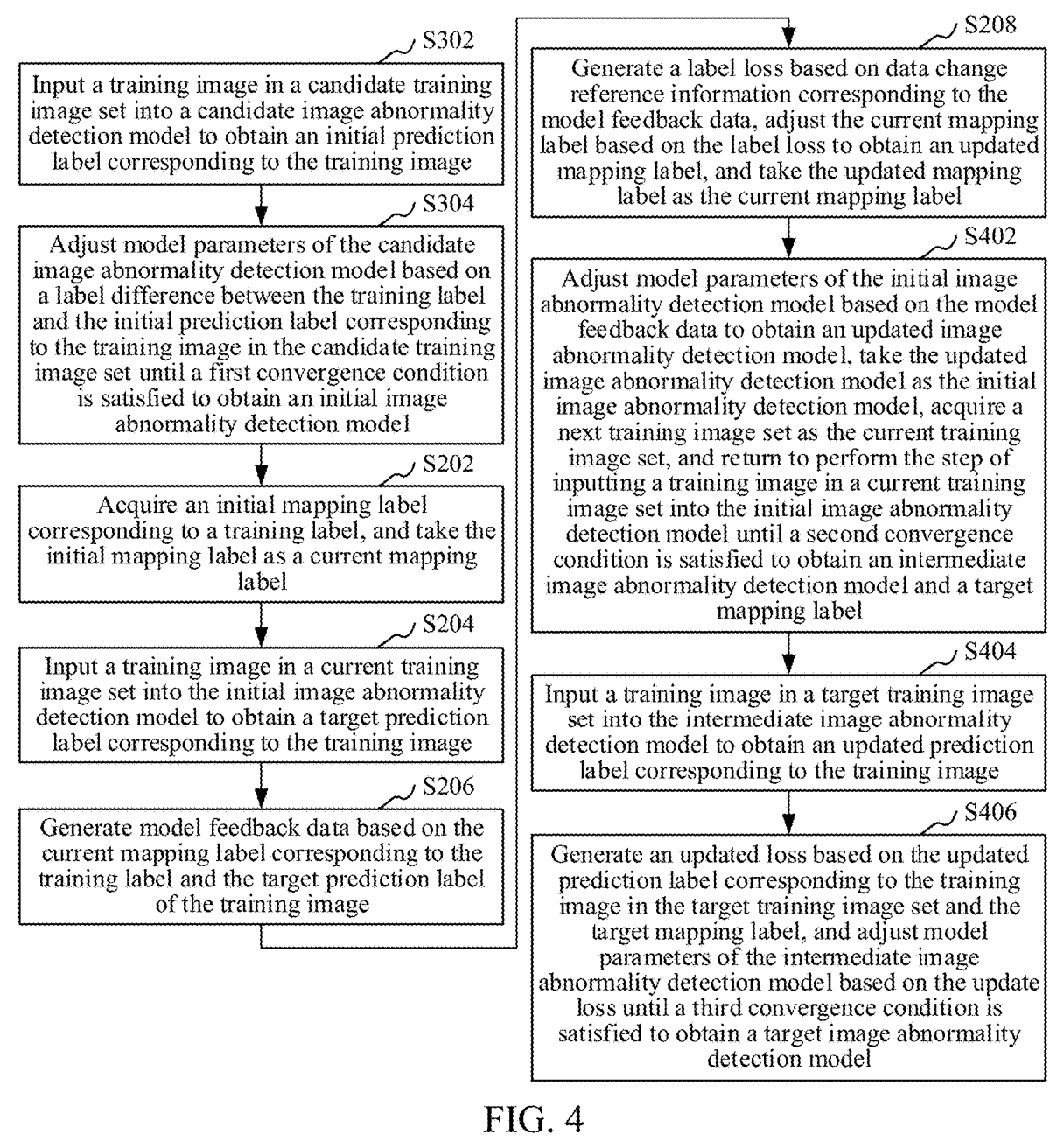

Input a training image in a candidate training image set into a candidate image abnormality detection model to obtain an initial prediction label corresponding to the training image

S304

Adjust model parameters of the candidate image abnormality detection model based on a label difference between the training label and the initial prediction label corresponding to the training image in the candidate training image set until a first convergence condition is satisfied to obtain an initial image abnormality detection model

S202

Acquire an initial mapping label corresponding to a training label, and take the initial mapping label as a current mapping label

S204

Input a training image in a current training image set into the initial image abnormality detection model to obtain a target prediction label corresponding to the training image

S206

Generate model feedback data based on the current mapping label corresponding to the training label and the target prediction label of the training image

S208

Generate a label loss based on data change reference information corresponding to the model feedback data, adjust the current mapping label based on the label loss to obtain an updated mapping label, and take the updated mapping label as the current mapping label

S402

Adjust model parameters of the initial image abnormality detection model based on the model feedback data to obtain an updated image abnormality detection model, take the updated image abnormality detection model as the initial image abnormality detection model, acquire a next training image set as the current training image set, and return to perform the step of inputting a training image in a current training image set into the initial image abnormality detection model until a second convergence condition is satisfied to obtain an intermediate image abnormality detection model and a target mapping label

S404

Input a training image in a target training image set into the intermediate image abnormality detection model to obtain an updated prediction label corresponding to the training image

S406

Generate an updated loss based on the updated prediction label corresponding to the training image in the target training image set and the target mapping label, and adjust model parameters of the intermediate image abnormality detection model based on the update loss until a third convergence condition is satisfied to obtain a target image abnormality detection model

Acquire an image to be detected

S504

Input the image to be detected into a target image abnormality detection model to obtain a model prediction label corresponding to the image to be detected

S506

Determine an image abnormality detection result corresponding to the image to be detected based on the model prediction label

FIG. 5

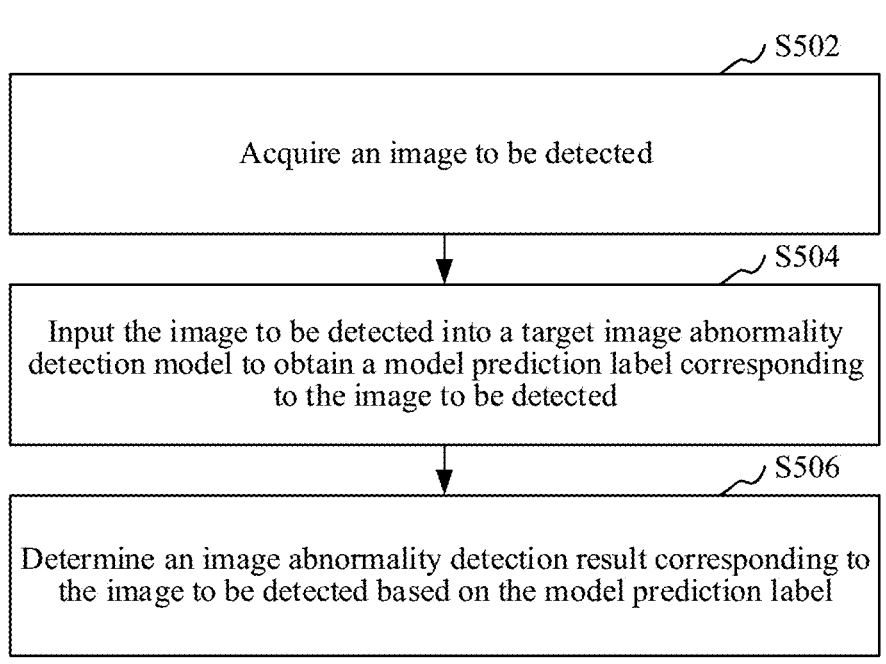

Slight blooming

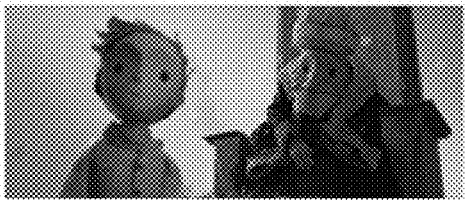

Partial blooming

Full blooming

FIG. 6

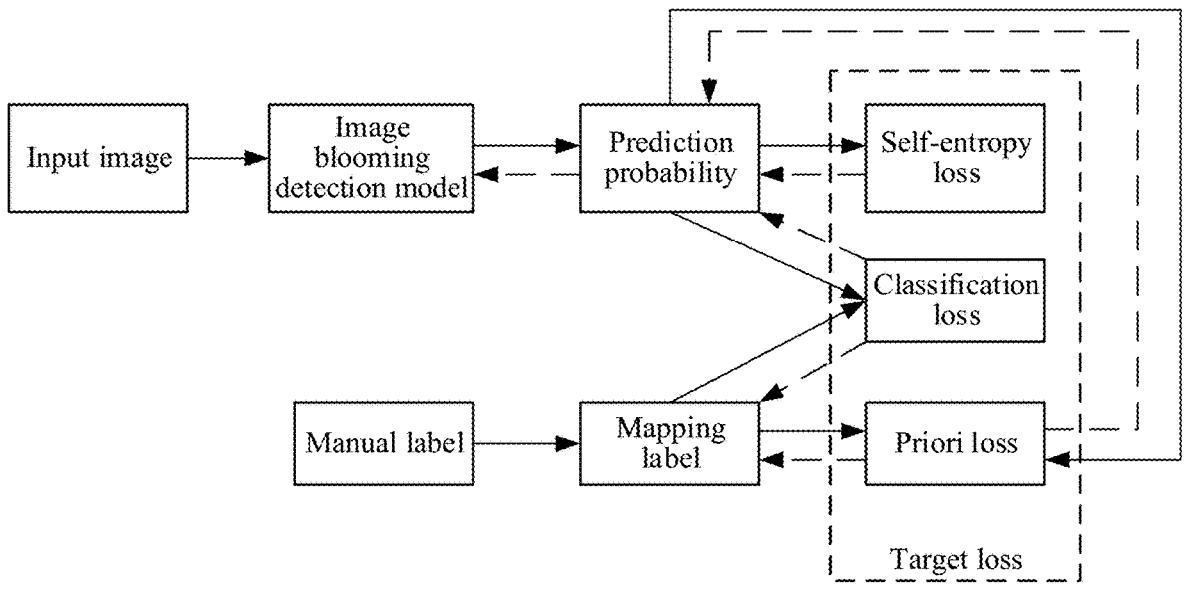
FIG. 7
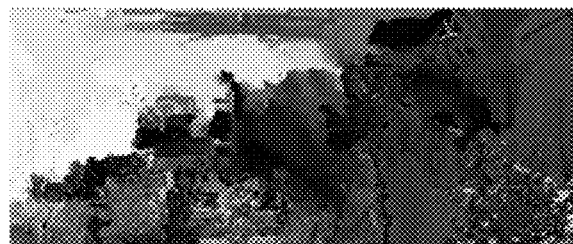
Blooming image (Blooming confidence is 0.99)
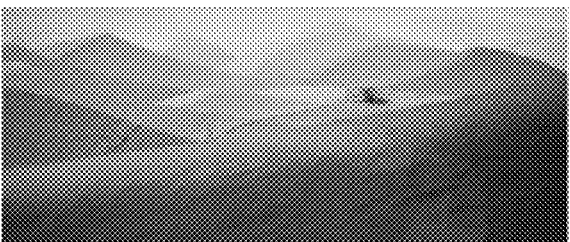
Normal image (Blooming confidence is 0.05)
FIG. 8

IMAGE ABNORMALITY DETECTION MODEL TRAINING

RELATED APPLICATIONS

This application is a continuation of International Application No. PCT/CN2022/110998 filed on Aug. 9, 2022, which claims priority to Chinese Patent Application No. 202111079651.0, filed on Sep. 15, 2021, and entitled "IMAGE ABNORMALITY DETECTION MODEL TRAINING METHOD AND APPARATUS, AND IMAGE ABNORMALITY DETECTION METHOD AND APPARATUS." The entire disclosures of the prior applications are hereby incorporated by reference.

FIELD OF THE TECHNOLOGY

This application relates to the field of computer technologies, including an image abnormality detection model training method and apparatus.

BACKGROUND OF THE DISCLOSURE

With the development of computer technologies, images are widely used in all walks of life, and the requirements for image quality are also higher and higher. Whether an image has an abnormality may be detected by training a machine learning model to screen out images with abnormalities and low quality.

In a related technology, model training is usually performed on the machine learning model based on training images. The training images are usually simple binary classification images, that is, the training images are divided into normal images and abnormal images. However, the abnormal images usually correspond to various degrees of abnormal cases, and simple binary classification labels may have a lot of subjectivity, which results in that training labels of the training images have noise, and the model trained based on such training images has a problem of low accuracy.

SUMMARY

This disclosure provides an image abnormality detection model training method and apparatus, an image abnormality detection method and apparatus, a computer device, a storage medium, and a computer program product.

In an embodiment, an image abnormality detection model training method includes acquiring a noise-containing training label as a current mapping label of a training image in a current training image set, and inputting the training image into an initial image abnormality detection model to obtain a prediction label corresponding to the training image. The method also includes generating model feedback data based on the current mapping label corresponding to the training label and the prediction label of the training image, and generating a label loss based on a data change of the model feedback data toward the current mapping label, adjusting the current mapping label based on the label loss to obtain an updated mapping label, and taking the updated mapping label as the current mapping label. The method further includes adjusting model parameters of the initial image abnormality detection model based on the model feedback data to obtain an updated image abnormality detection model, taking the updated image abnormality detection model as the initial image abnormality detection model, and acquiring a next training image set as the current training image set. The method further includes iteratively performing the inputting the training image, the generating the model feedback data, the generating the label loss, and the adjusting the model parameters until a training end condition is satisfied to obtain a trained image abnormality detection model.

In an embodiment, an image abnormality detection model training apparatus includes processing circuitry configured to acquire a noise-containing training label as a current mapping label of a training image in a current training image set, and input the training image into an initial image abnormality detection model to obtain a prediction label corresponding to the training image. The processing circuitry is further configured to generate model feedback data based on the current mapping label corresponding to the training label and the prediction label of the training image, and generate a label loss based on a data change of the model feedback data toward the current mapping label, adjust the current mapping label based on the label loss to obtain an updated mapping label, and take the updated mapping label as the current mapping label. The processing circuitry is further configured to adjust model parameters of the initial image abnormality detection model based on the model feedback data to obtain an updated image abnormality detection model, take the updated image abnormality detection model as the initial image abnormality detection model, acquire a next training image set as the current training image set. The processing circuitry is further configured to iteratively input the training image in the current training image set, generate the model feedback data, generate the label loss, and adjust the model parameters until a training end condition is satisfied to obtain a trained image abnormality detection model.

In an embodiment, a non-transitory computer-readable storage medium stores computer-readable instructions thereon, which, when executed by processing circuitry, cause the processing circuitry to perform an image abnormality detection model training method. The image abnormality detection model training method includes acquiring a noise-containing training label as a current mapping label of a training image in a current training image set, and inputting the training image into an initial image abnormality detection model to obtain a prediction label corresponding to the training image. The method also includes generating model feedback data based on the current mapping label corresponding to the training label and the prediction label of the training image, and generating a label loss based on a data change of the model feedback data toward the current mapping label, adjusting the current mapping label based on the label loss to obtain an updated mapping label, and taking the updated mapping label as the current mapping label. The method further includes adjusting model parameters of the initial image abnormality detection model based on the model feedback data to obtain an updated image abnormality detection model, taking the updated image abnormality detection model as the initial image abnormality detection model, and acquiring a next training image set as the current training image set. The method further includes iteratively performing the inputting the training image, the generating the model feedback data, the generating the label loss, and the adjusting the model parameters until a training end condition is satisfied to obtain a trained image abnormality detection model.

Details of one or more embodiments of this disclosure are set forth in the following drawings and description. Other features, objectives, and advantages of this disclosure will be apparent from the specification, drawings, and claims.

BRIEF DESCRIPTION OF THE DRAWINGS

In order to describe technical solutions in embodiments of this disclosure more clearly, the drawings used in descriptions about the embodiments will be simply introduced below. The drawings in the following descriptions are only some embodiments of this disclosure. Those of ordinary skill in the art may further obtain other drawings according to these drawings.

FIG. 1 is a diagram of an application environment of an image abnormality detection model training method and an image abnormality detection method in one embodiment.

FIG. 2 is a schematic flowchart of an image abnormality detection model training method in one embodiment.

FIG. 3 is a schematic flowchart of an image abnormality detection model training method in another embodiment.

FIG. 4 is a schematic flowchart of an image abnormality detection model training method in still another embodiment.

FIG. 5 is a schematic flowchart of an image abnormality detection method in one embodiment.

FIG. 6 is a schematic diagram of a blooming image in one embodiment.

FIG. 7 is a schematic flowchart of an image blooming detection model training method in one embodiment.

FIG. 8 is a schematic diagram of an image blooming detection result in one embodiment.

DESCRIPTION OF EMBODIMENTS

Figure 9:
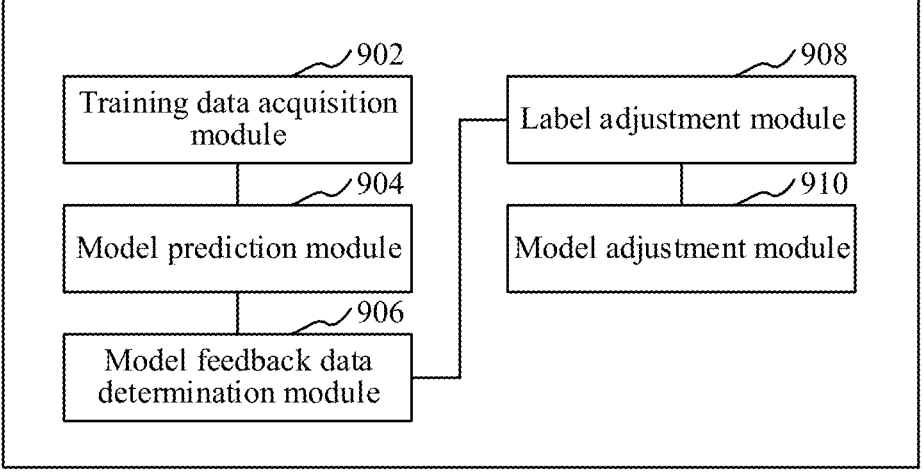
FIG. 9 is a structural block diagram of an image abnormality detection model training apparatus in one embodiment.

In order to make the objectives, technical solutions, and advantages of this disclosure more comprehensible, this disclosure will be further described in detail below with reference to the drawings and embodiments. It is to be understood that specific embodiments described herein are merely used to explain this disclosure and are not intended to limit this disclosure.

The solutions provided by the embodiments of this disclosure relate to technologies, such as computer vision technology, natural language processing, and machine learning, of artificial intelligence, and are specifically described by the following embodiments.

An image abnormality detection model training method and an image abnormality detection method provided by this disclosure may be applied to an application environment as shown in FIG. 1. A terminal 102 communicates with a server 104 through a network. The terminal 102 may be, but is not limited to, various desktop computers, notebook computers, smart phones, tablet computers, Internet of Things devices, and portable wearable devices. The Internet of Things devices may be smart speakers, smart televisions, smart air conditioners, smart in-vehicle devices, and the like. The portable wearable devices may be smart watches, smart bracelets, head-mounted devices, and the like. The server 104 may be implemented by an independent server or a server cluster composed of a plurality of servers or a cloud server.

Both the terminal 102 and the server 104 may be independently configured to perform the image abnormality detection model training method and the image abnormality detection method provided in the embodiments of this disclosure.

For example, the server acquires an initial mapping label corresponding to a training label, takes the initial mapping label as a current mapping label, and inputs a training image in a current training image set into an initial image abnormality detection model to obtain a target prediction label corresponding to the training image. The server generates model feedback data based on the current mapping label corresponding to the training label and the target prediction label of the training image, generates a label loss based on data change reference information corresponding to the model feedback data, adjusts the current mapping label based on the label loss to obtain an updated mapping label, and takes the updated mapping label as the current mapping label. The server adjusts model parameters of the initial image abnormality detection model based on the model feedback data to obtain an updated image abnormality detection model, takes the updated image abnormality detection model as the initial image abnormality detection model, acquires a next training image set as the current training image set, and returns to perform the step of inputting a training image in a current training image set into an initial image abnormality detection model until a training end condition is satisfied to obtain a target image abnormality detection model.

The server acquires an image to be detected, inputs the image to be detected into the target image abnormality detection model to obtain a model prediction label corresponding to the image to be detected, and determines an image abnormality detection result corresponding to the image to be detected based on the model prediction label.

The terminal 102 and the server 104 may also be cooperatively configured to perform the image abnormality detection model training method and the image abnormality detection method provided in the embodiments of this disclosure.

For example, the server acquires a training image set from the terminal. The server acquires an initial mapping label corresponding to a training label, takes the initial mapping label as a current mapping label, and inputs a training image into an initial image abnormality detection model to obtain a target prediction label corresponding to the training image. The server generates model feedback data based on the current mapping label corresponding to the training label and the target prediction label of the training image, generates a label loss based on data change reference information corresponding to the model feedback data, adjusts the current mapping label based on the label loss to obtain an updated mapping label, and takes the updated mapping label as the current mapping label. The server adjusts model parameters of the initial image abnormality detection model based on the model feedback data to obtain an updated image abnormality detection model, takes the updated image abnormality detection model as the initial image abnormality detection model, acquires a next training image set as the current training image set, and returns to perform the step of inputting a training image in a current training image set into an initial image abnormality detection model until a training end condition is satisfied to obtain a target image abnormality detection model. The server sends the target image abnormality detection model to the terminal.

The terminal acquires an image to be detected. The terminal inputs the image to be detected into the target image abnormality detection model to obtain a model prediction label corresponding to the image to be detected. The terminal determines an image abnormality detection result corresponding to the image to be detected based on the model prediction label.

In one embodiment, as shown in FIG. 2, an image abnormality detection model training method is provided, which is described by taking an example in which the method is applied to a computer in FIG. 1. It is to be understood that a computer device may be either the terminal 102 or the server 104. In this embodiment, the image abnormality detection model training method includes the following steps:

Step S202: Acquire an initial mapping label corresponding to a training label, and take the initial mapping label as a current mapping label. For example, a noise-containing training label is acquired as a current mapping label of a training image in a current training image set.

The training label is a manually labeled label used for identifying an image abnormality determination result of a training image. The training image refers to an image used for model training. The image may be a picture or a video frame in a video. The training label may be a binary classification label. For example, a training label corresponding to an image with an abnormality is a negative label and represented by 1, and a training label corresponding to an image without an abnormality is a positive label and represented by 0. The training label may also be a multi-classification label. For example, a training label corresponding to an image without an abnormality is a first label and represented by 0, a training label corresponding to an image with an obvious abnormality is a second label and represented by 1, and a training label corresponding to an image with a slight abnormality is a third label and represented by 2.

The initial mapping label is obtained by performing mapping transformation on the training label. The mapping transformation is used for transforming discrete training labels into data that is easy for a model to learn and calculate. A training label is usually represented by a constant value, and after mapping transformation, an initial mapping label corresponding to the training label may be represented by a vector. In one embodiment, distances between various initial mapping labels are consistent.

Specifically, the computer device may acquire a training sample of an image abnormality detection model locally or from another terminal or server, and the training sample includes a training image and a training label corresponding to the training image. The computer device may perform mapping transformation on the training label to obtain an initial mapping label. It is to be understood that the computer device may perform the mapping transformation by using a custom algorithm or formula. Of course, the training sample may also directly include the training image, the corresponding training label, and the initial mapping label.

The training label is a manually labeled label with certain human subjectivity, which results in that the training label has noise. In order to reduce the noise in the training label, a noise-containing training label may be distinguished and corrected by using feature learning ability of a neural network. Therefore, during model training, in addition to adjusting model parameters, the training label may also be adjusted synchronously. The model training uses an iterative training method. In the first round of iterative training, the initial mapping label is taken as a current mapping label. The current mapping label is taken as a supervisory signal of a model for performing the model training. In the first round of iterative training, the initial mapping label may also be adjusted to obtain an updated mapping label. In a next round of iterative training, the updated mapping label obtained in the previous round is taken as a new current mapping label. The new current mapping label is taken as the supervisory signal of the model for model training. In the next round of iterative training, the updated mapping label obtained in the previous round may also be readjusted to obtain a new updated mapping label. By analogy, through a plurality of rounds of iterative training, the noise-containing training label is distinguished and corrected continuously by using the feature learning ability of the neural network, and then the performance of the model is greatly improved. Finally, the image abnormality detection model with excellent performance is obtained by training.

Further, different model training samples may be set for different types of image abnormalities, and each model training sample is used for specially training a corresponding image abnormality detection model. For example, the image abnormalities include image blooming, image blurring, image mosaic, image smear, and the like. Taking the image blooming and the image blurring as an example, for the image blooming, an image blooming detection model may be specially trained, and a training label of a training image in a training sample corresponding to the image blooming detection model is used for identifying whether there is blooming in an image. For the image blurring, an image blurring detection model may be specially trained, and a training label of a training image in a training sample corresponding to the image blurring detection model is used for identifying whether there is blurring in an image.

Step S204: Input a training image in a current training image set into an initial image abnormality detection model to obtain a target prediction label corresponding to the training image. For example, the training image is input into an initial image abnormality detection model to obtain a prediction label corresponding to the training image.

The current training image set refers to a currently used training image set. The current training image set includes at least one training image.

The initial image abnormality detection model refers to an image abnormality detection model to be trained. The image abnormality detection model is a machine learning model, and specifically, may be models of a convolutional neural network, a deep neural network, and the like. Input data of the image abnormality detection model is an image, and output data is a prediction label. The prediction label is used for identifying the probability of whether an input image is abnormal. The prediction label may also be represented by a vector.

Specifically, the computer device may input the training image into the initial image abnormality detection model, and may output the target prediction label corresponding to the training image through data processing of input data by the initial image abnormality detection model.

In one embodiment, the initial image abnormality detection model may be an original image abnormality detection model. Model parameters in the original image abnormality detection model are randomly initialized, that is, the initial image abnormality detection model may be an original model without any model training. The initial image abnormality detection model may also be a pre-trained image abnormality detection model, that is, the initial image abnormality detection model may be obtained by pre-training the original image abnormality detection model.

Step S206: Generate model feedback data based on the current mapping label corresponding to the training label and the target prediction label of the training image. For example, model feedback data is generated based on the current mapping label corresponding to the training label and the prediction label of the training image.

The model feedback data is used for characterizing a data difference between the current mapping label and the target prediction label. During model training, the model parameters are adjusted based on the model feedback data, so that the output data of the model is closer and closer to the current mapping label and is closer and closer to a real result.

Specifically, the computer device may calculate to obtain the model feedback data based on a data distribution difference between the current mapping label corresponding to the training label of the training image and the target prediction label corresponding to the training image. For example, a distance between the current mapping label corresponding to the training label and the target prediction label of the training image may be calculated to obtain a classification loss, and the classification loss is taken as the model feedback data. A priori loss may also be obtained based on the training label and the target prediction label, and the model feedback data may be obtained based on the classification loss and the priori loss. A self-entropy loss may also be obtained based on the target prediction label. The model feedback data may be obtained based on the classification loss, the priori loss, and the self-entropy loss, or the model feedback data may also be obtained based on the classification loss and the self-entropy loss. All of the classification loss, the priori loss, and the self-entropy loss may be obtained by performing divergence calculation on data, or may also be obtained by performing cross entropy calculation on the data, or may also be calculated by a custom formula or algorithm.

Step S208: Generate a label loss based on data change reference information corresponding to the model feedback data, adjust the current mapping label based on the label loss to obtain an updated mapping label, and take the updated mapping label as the current mapping label. For example, a label loss is generated based on a data change of the model feedback data toward the current mapping label, the current mapping label is adjusted based on the label loss to obtain an updated mapping label, and the updated mapping label is taken as the current mapping label.

Specifically, the data change reference information is used for measuring a data change speed of the model feedback data in the direction of the current mapping label. It is be understood that the model feedback data is obtained based on the current mapping label and the target prediction label. For the model feedback data, both the current mapping label and the target prediction label are variables. Since the label loss is used for adjusting the current mapping label corresponding to the training label, the computer device may generate the data change reference information based on the change speed of the model feedback data in the direction of the current mapping label, then generate the label loss based on the data change reference information, adjust the current mapping label based on the label loss to obtain an updated mapping label, and take the updated mapping label as a new current mapping label. For example, a gradient may be used for measuring a change speed of a function in a certain direction. Therefore, the computer device may calculate a gradient of the model feedback data to the current mapping label to obtain a loss gradient, take the loss gradient as the data change reference information, obtain the label loss based on the loss gradient, and adjust the current mapping label based on the label loss to obtain the updated mapping label. The computer device may take the updated mapping label as the current mapping label in the next round of model training, and continuously distinguish and correct the noise-containing training label through model iterations. Of course, the computer device may also calculate the data change reference information by using the custom formula or algorithm.

The generation of the label loss based on the data change reference information may be that the data change reference information is taken as the label loss, or that the data change reference information and a hyper-parameter are fused, and the fused data is taken as the label loss. The hyper-parameter may be a preset fixed value, and the hyper-parameter may also be used as a model parameter to adjust and learn during the model training.

Step S210: Adjust model parameters of the initial image abnormality detection model based on the model feedback data to obtain an updated image abnormality detection model, take the updated image abnormality detection model as the initial image abnormality detection model, acquire a next training image set as the current training image set, and return to perform the step of inputting a training image in a current training image set into an initial image abnormality detection model until a training end condition is satisfied to obtain a target image abnormality detection model. For example, model parameters of the initial image abnormality detection model are adjusted based on the model feedback data to obtain an updated image abnormality detection model, the updated image abnormality detection model is taken as the initial image abnormality detection model, and a next training image set is acquired as the current training image set. Then, for example, the inputting the training image, the generating the model feedback data, the generating the label loss, and the adjusting the model parameters are iteratively performed until a training end condition is satisfied to obtain a trained image abnormality detection model.

The updated image abnormality detection model refers to a model obtained by adjusting the model parameters of the initial image abnormality detection model. The target image abnormality detection model refers to a trained image abnormality detection model.

Specifically, in addition to adjusting the current mapping label based on the model feedback data, the computer device also needs to synchronously adjust the model parameters based on the model feedback data. The computer device may update the model parameters of the initial image abnormality detection model by performing back propagation based on the model feedback data to obtain an updated image abnormality detection model. The computer device may take the updated image abnormality detection model as a new initial image abnormality detection model, take the updated mapping label as a new current mapping label, acquire a next training image set as a new current training image set, and start a new round of model iterative training based on the new current training image set, the current mapping label, and the initial image abnormality detection model. In a new round of model iterative training, the computer device may input a training image in the new current training image set into the updated initial image abnormality detection model to obtain an updated target prediction label, generate updated model feedback data based on the updated current mapping label and the updated target prediction label, and readjust the current mapping label and the model parameters of the initial image abnormality detection model based on the updated model feedback data. By analogy, the above steps are repeated until the training end condition is satisfied, and the training is stopped to obtain the target image abnormality detection model.

The training end condition includes at least one of the following: the number of model iterations being greater than a preset number of iterations, a numerical value of the model feedback data being less than a preset target numerical value, a change rate of the model feedback data being less than a preset change rate, the minimization of the model feedback data, and the like. The preset number of iterations, the preset target numerical value, and the preset change rate are all preset data, and may be specifically set according to actual needs.

For example, in the first round of iterative training, the initial mapping label is taken as the current mapping label. Model training is performed on the initial image abnormality detection model based on the current mapping label and a training image set A1 to adjust the model parameters to obtain an updated image abnormality detection model A2, and the initial mapping label is adjusted synchronously to obtain an updated mapping label A3. In the second round of iterative training, the updated mapping label A3 obtained in the first round is taken as a new current mapping label, the updated image abnormality detection model A2 obtained in the first round is taken as a new initial image abnormality detection model, model training is performed on the initial image abnormality detection model based on the current mapping label and a training image set B1 to adjust the model parameters to obtain an updated image abnormality detection model B2, and the initial mapping label is synchronously adjusted to obtain an updated mapping label B3. In the third round of iterative training, the updated mapping label B3 obtained in the second round is taken as a new current mapping label, the updated image abnormality detection model B2 obtained in the second round is taken as a new initial image abnormality detection model, model training is performed on the initial image abnormality detection model based on the current mapping label and a training image set C1 to adjust the model parameters to obtain an updated image abnormality detection model C2, and the initial mapping label is adjusted synchronously to obtain an updated mapping label C3. By analogy, after a plurality of rounds of iterative training, if the number of model iterations is greater than the preset number of iterations, the updated image abnormality detection model obtained from the latest round of iterative training is taken as the target image abnormality detection model.

It is to be understood that various training image sets may include the same training image. Various training image sets may also include different training images.

In one embodiment, the computer device may adjust the model parameters of the initial image abnormality detection model through a gradient descent algorithm based on the model feedback data.

In one embodiment, the computer device may train the current mapping label and the initial image abnormality detection model based on the model feedback data until a first training end condition is satisfied to obtain an intermediate image abnormality detection model and a target mapping label, and may directly take the intermediate image abnormality detection model as the target image abnormality detection model. Further, the computer device may also keep the target mapping label unchanged, train the intermediate image abnormality detection model based on a training image set, and finely adjust model parameters of the intermediate image abnormality detection model to obtain the target image abnormality detection model. For example, a training image in the training image set may be input into the intermediate image abnormality detection model to obtain an updated prediction label, an updated loss may be calculated based on the updated prediction label and the target mapping label, and the model parameters of the intermediate image abnormality detection model may be adjusted based on the updated loss until a second training end condition is satisfied to obtain the target image abnormality detection model. The first training end condition and the second training end condition may be the same training end condition, for example, the number of model iterations being greater than the preset number of iterations, or may be different training end conditions, for example, the first training end condition is that the numerical value of the model feedback data being less than the preset target numerical value, and the second training end condition is that the number of model iterations being greater than the preset number of iterations.

In one embodiment, the target image abnormality detection model is any one of an image blooming detection model, an image blurring detection model, and an image mosaic detection model.

The image blooming detection model is configured to detect whether an input image has a blooming phenomenon. The blooming phenomenon is an image abnormality caused by a problem in the encoding or decoding process of an image. The image blurring detection model is configured to detect whether the input image has a blurring phenomenon. The blurring phenomenon is an image abnormality caused by a photographing parameter or a photographing angle of a photographing apparatus during image photographing. The image mosaic detection model is configured to detect whether the input image has a mosaic phenomenon. The mosaic phenomenon is an image abnormality caused by deterioration of tone scale details in local areas of the image. The image abnormality detection model training method of this disclosure is applicable to various image abnormality detection models, and may effectively improve the efficiency and accuracy of image abnormality detection.

In the above image abnormality detection model training method, the initial mapping label corresponding to the training label is acquired, the initial mapping label is taken as the current mapping label, the training image in the current training image set is input into the initial image abnormality detection model to obtain the target prediction label corresponding to the training image, the model feedback data is generated based on the current mapping label corresponding to the training label and the target prediction label of the training image, the label loss is generated based on the data change reference information corresponding to the model feedback data, the current mapping label is adjusted based on the label loss to obtain the updated mapping label, the updated mapping label is taken as the current mapping label, the model parameters of the initial image abnormality detection model are adjusted based on the model feedback data to obtain the updated image abnormality detection model, the updated image abnormality detection model is taken as the initial image abnormality detection model, the next training image set is acquired as the current training image set, and the step of inputting a training image in a current training image set into an initial image abnormality detection model is returned to perform until the training end condition is satisfied to obtain the target image abnormality detection model. In this way, the current mapping label and the model parameters are adjusted synchronously during the model training, and the current mapping label corresponding to the noise-containing training label is self-corrected by using feature learning ability of the model, which can effectively filter the influence of noise data on the performance of the model, greatly improve the performance of the model, and finally train to obtain an image abnormality detection model with high accuracy. During subsequent model application, an image abnormality detection result with high accuracy may be obtained based on the image abnormality detection model with high accuracy, which effectively improves the detection accuracy and the detection efficiency of image abnormality detection.

In one embodiment, the step of acquiring an initial mapping label corresponding to a training label includes:

performing label encoding on a training label based on a quantity of label classes corresponding to the training label to obtain an initial mapping label.

The quantity of label classes refers to the number of label classes of the training label. For example, if the training label is a binary classification label, then the quantity of label classes is 2; and if the training label is a four-classification label, then the quantity of label classes is 4. Label encoding is used for transforming the training label into data represented by binary.

Specifically, the computer device may perform label encoding on the training label based on the quantity of label classes corresponding to the training label, and map and transform the training label into the initial mapping label. The computer device may specifically determine a quantity of vector dimensions corresponding to the initial mapping label based on the quantity of label classes. An initial vector value in each vector dimension defaults to a first preset value. The initial vector values in all vector dimensions are respectively transformed into second preset values in sequence, so as to obtain the initial mapping label corresponding to the training label of each label class. One vector dimension corresponds to one label class, and a vector value on each vector dimension represents a probability that an image belongs to the corresponding label class. For example, if the training label is a binary classification label, the quantity of label classes is 2, and then the quantity of vector dimensions corresponding to the initial mapping label is 2, that is, the initial mapping label is a two-dimensional vector. The initial form of the two-dimensional vector may be [0, 0], that is, the first preset value is 0, and the second preset value is 1. The initial values in all vector dimensions are respectively transformed into the second preset value in sequence, then an initial mapping label corresponding to a positive label in the binary classification label is [0, 1], and an initial mapping label corresponding to a negative label is [1, 0]. Taking [0, 1] as an example, 0 indicates the probability that the image belongs to the negative label, and 1 indicates the probability that the image belongs to the positive label. If the training label is a three-classification label, the quantity of label classes is 3, and then the quantity of vector dimensions corresponding to the initial mapping label is 3, that is, the initial mapping label is a three-dimensional vector. The initial form of the three-dimensional vector may be [0, 0, 0], an initial mapping label corresponding to a first label in the three-classification label is [0, 0, 1], an initial mapping label corresponding to a second label is [0, 1, 0], and an initial mapping label corresponding to a third label is [1, 0, 0]. Distances between every two initial mapping labels are the same. Of course, the first preset value may be 1, and the second preset value may be 0. It is to be understood that as the model and the network are updated subsequently, the initial mapping label will be softened gradually. For example, the initial mapping label [1, 0] corresponding to the negative label will be adjusted to [0.8, 0.2].

In this embodiment, label encoding is performed on the training label based on the quantity of label classes corresponding to the training label to obtain the initial mapping label. The initial mapping label is composed of binary data. The distances between every two initial mapping labels are the same, and the initial mapping labels are easy for the model to learn and calculate.

In one embodiment, as shown in FIG. 3, before the step of inputting a training image in a current training image set into an initial image abnormality detection model to obtain a target prediction label corresponding to the training image, the method further includes the following steps:

Step S302: Input a training image in a candidate training image set into a candidate image abnormality detection model to obtain an initial prediction label corresponding to the training image.

Step S304: Adjust model parameters of the candidate image abnormality detection model based on a label difference between the training label and the initial prediction label corresponding to the training image in the candidate training image set until a first convergence condition is satisfied to obtain an initial image abnormality detection model.

The candidate image abnormality detection model is an original image abnormality detection model, and the model parameters in the candidate image abnormality detection model may be randomly initialized or may be manually set initial values. The candidate training image set refers to a training image set for training the candidate image abnormality detection model, and the candidate training image set may include at least one training image. The candidate training image set and the current training image set may be the same training image set, or may be different training image sets, that is, the candidate training image set and the current training image set may include the same training image, or may include different training images.

Specifically, in addition to directly acquiring the candidate image abnormality detection model as the initial image abnormality detection model, the computer device may also pre-train the candidate image abnormality detection model, and take the trained candidate image abnormality detection model as the initial image abnormality detection model. When the candidate image abnormality detection model is trained, only the model parameters are adjusted, and the training label is not adjusted, so that subsequent model training for the initial image abnormality detection model may converge more quickly than the training from the beginning.

During training, the computer device inputs the training image in the candidate training image set into the candidate image abnormality detection model, and may output an initial prediction label corresponding to the training image through data processing of input data by the candidate image abnormality detection model. The computer device may generate a training loss based on a label difference between the training label and the initial prediction label corresponding to the training image, and perform back propagation based on the training loss to update the model parameters of the candidate image abnormality detection model until the first convergence condition is satisfied to obtain the initial image abnormality detection model. A distance between the training label and the initial prediction label may be calculated to obtain the training loss. For example, divergence calculation is performed on the initial prediction label and the training label to obtain the training loss. Cross entropy calculation is performed on the initial prediction label and the training label to obtain the training loss, and the like. The first convergence condition may be at least one of the following: the number of model iterations reaching a first preset threshold value, a numerical value of the training loss being less than a preset training numerical value, and the like.

In this embodiment, the candidate image abnormality detection model is pre-trained to obtain the initial image abnormality detection model, which can reduce the training difficulty of the initial image abnormality detection model, and increase the training speed. It is to be understood that if the candidate image abnormality detection model is directly acquired as the initial image abnormality detection model, since the model parameters are randomly initialized, it is difficult to update the model parameters and the current mapping label simultaneously, and there may be instability in training. Therefore, initially, the current mapping label is fixed, only network parameters are updated, and model training is performed on the candidate image abnormality detection model to obtain the initial image abnormality detection model; and during subsequent training of the initial image abnormality detection model, the model parameters and the current mapping label are updated simultaneously, which can effectively reduce the training difficulty.

In one embodiment, the step of generating model feedback data based on the current mapping label and the target prediction label includes:

performing divergence calculation on the current mapping label and the target prediction label to obtain a first loss; acquiring a label distribution ratio corresponding to the training label, and obtaining a second loss based on the label distribution ratio and the target prediction label, the label distribution ratio being determined based on a quantity of training images, respectively corresponding to each label class, in the current training image set; and obtaining the model feedback data based on the first loss and the second loss.

Divergence calculation is a calculation method for measuring a distribution difference between two pieces of data. The label distribution ratio is used for representing a training image distribution condition between label classes. The label distribution ratio is determined based on the quantity of training images of each label class in the current training image set. Specifically, a ratio between the quantities of training images of each label class may be taken as the label distribution ratio. For example, if the training label is a binary classification label, in the current training image set, there are 30 images with a positive label and 30 images with a negative label, and then the label distribution ratio is 30:30=1:1. If the training label is a three-classification label, in the current training image set, there are 30 images with a first label, 30 images with a second label, and 60 images with a third label, and then the label distribution ratio is 30:30:60=1:1:2.

Specifically, the computer device may perform divergence calculation on the current mapping label and the target prediction label to obtain a first loss. The first loss is used for measuring a difference between the prediction probability output by the current model and manually labeled data, and the first loss may also be referred to as a classification loss. In addition to the first loss, the computer device may also acquire the label distribution ratio corresponding to the training label, and calculate a second loss based on the label distribution ratio and the target prediction label. The second loss is used for measuring a distance between the prediction probability output by the current model and a priori label distribution ratio, and the second loss may also be referred to as a priori loss. The purpose of the priori loss is to make the prediction probability not too far from the label distribution ratio. The computer device may fuse the calculated first loss and second loss to obtain the model feedback data. For example, the first loss and the second loss are added to obtain the model feedback data, and a weighted sum of the first loss and the second loss is taken as the model feedback data.

It is to be understood that, although the manually labeled labels have noise, in general, the accuracy of most manually labeled labels is relatively high, that is, most manually labeled labels are correct and only a few manually labeled labels have noise. Therefore, the second loss is introduced to make the target prediction label not too far from the label distribution ratio, so as to improve the accuracy of the model feedback data. In this embodiment, the first loss is obtained by performing the divergence calculation on the current mapping label and the target prediction label, the second loss is obtained based on the label distribution ratio and the target prediction label, and the model feedback data is obtained based on the first loss and the second loss. The model feedback data is composed of different types of losses, and the accuracy of model training may be improved by training the model by adjusting the model parameters and the current mapping label based on such model feedback data.

In one embodiment, the step of performing divergence calculation on the current mapping label and the target prediction label to obtain a first loss includes:

performing logarithmic transformation on a ratio of the current mapping label to the target prediction label to obtain a label transformation ratio; and fusing the label transformation ratio and the target prediction label to obtain the first loss.

Specifically, the computer device may calculate a ratio of the current mapping label to the target prediction label, and perform the logarithmic transformation on the ratio to obtain the label transformation ratio for calculating the first loss. Specifically, the logarithmic transformation may be performed by taking a preset value as a base number and taking the ratio of the current mapping label to the target prediction label as a true number to obtain the label transformation ratio; or the logarithmic transformation may be performed by taking a preset value as a base number and taking a fusion value of the ratio and a constant value as a true number to obtain the label transformation ratio. The preset value and the constant value may be set as required. For example, the preset value and the constant value are data greater than 1. The fusion value may be a sum of the ratio of the current mapping label to the target prediction label and the constant value, may also be a product of the ratio of the current mapping label to the target prediction label and the constant value, and the like. Further, the computer device may fuse the target prediction label and the label transformation ratio to obtain the first loss. For example, a product of the target prediction label and the label transformation ratio is taken as the first loss, and a weighted product of the target prediction label and the label transformation ratio is taken as the first loss.

It is to be understood that the closer the current mapping label and the target prediction label are, the closer the label transformation ratio is to zero. An optimization direction of the first loss is that the closer the current mapping label and the target prediction label are, the better.

In one embodiment, a calculation formula for the first loss is as follows:

$$L_c = p * \log \frac{p}{\hat{y}}$$

where, $L_c$ represents the first loss, p represents the target prediction label, and $\hat{y}$ represents the current mapping label.

$$\log \frac{p}{\hat{y}}$$

represents the label transformation ratio. p and $\hat{y}$ are vectors. When $L_c$ is calculated, vector values of the same vector dimension in p and $\hat{y}$ are calculated based on the above formula, and $L_c$ is finally obtained based on a calculation result of each vector dimension.

In this embodiment, the label transformation ratio is obtained by performing logarithmic transformation on the ratio of the current mapping label to the target prediction label, and the first loss may be quickly obtained by fusing the label transformation ratio and the target prediction label. The closer and more similar the current mapping label and the target prediction label are, the closer the first loss is to zero.

In one embodiment, the step of performing divergence calculation on the current mapping label and the target prediction label to obtain a first loss includes:

counting the current mapping label and the target prediction label to obtain label counting information; performing logarithmic transformation on a ratio of the label counting information to the target prediction label to obtain a first transformation ratio, and performing logarithmic transformation on a ratio of the label counting information to the current mapping label to obtain a second transformation ratio; fusing the target prediction label and the first transformation ratio to obtain a first sub-loss, and fusing the second transformation ratio and the current mapping label to obtain a second sub-loss; and obtaining the first loss based on the first sub-loss and the second sub-loss.

Specifically, the computer device may count the current mapping label and the target prediction label, and take a counting result as the label counting information. For example, a mean value of the current mapping label and the target prediction label is taken as the label counting information, and a sum of the current mapping label and the target prediction label is taken as the label counting information. Further, the computer device performs the logarithmic transformation on the ratio of the label counting information to the target prediction label to obtain the first transformation ratio, and performs the logarithmic transformation on the ratio of the label counting information to the current mapping label to obtain the second transformation ratio. For example, the logarithmic transformation is performed by taking a preset value as a base number and taking the ratio of the label counting information to the target prediction label as a true number to obtain the first transformation ratio, and the logarithmic transformation is performed by taking a preset value as a base number and taking the ratio of the label counting information to the current mapping label as a true number to obtain the second transformation ratio. The computer device fuses the target prediction label and the first transformation ratio to obtain the first sub-loss, and fuses the current mapping label and the second transformation ratio to obtain the second sub-loss. For example, a product of the target prediction label and the first transformation ratio is taken as the first sub-loss, and a product of the current mapping label and the second transformation ratio is taken as the second sub-loss. Finally, the computer device may obtain the first loss based on the first sub-loss and the second sub-loss. For example, the first sub-loss and the second sub-loss are added to obtain the first loss, and a weighted sum of the first sub-loss and the second sub-loss is taken as the first loss.

It is to be understood that the closer the current mapping label and the target prediction label are, the closer the first transformation ratio and the second transformation ratio are to zero. The closer the current mapping label and the target prediction label are, the smaller the first loss is.

In one embodiment, a calculation formula for the first loss is as follows:

$$L_c = \frac{1}{2} p * \log \frac{p}{\frac{p + \hat{y}}{2}} + \frac{1}{2} \hat{y} * \log \frac{\hat{y}}{\frac{p + \hat{y}}{2}}$$

where, $L_c$ represents the first loss, p represents the target prediction label, and $\hat{y}$ represents the current mapping label $$\frac{p + \hat{y}}{2}$$

represents the label counting information, $$\log \frac{p}{\frac{p + \hat{y}}{2}}$$

represents the first transformation ratio, and $$\log \frac{\hat{y}}{\frac{p + \hat{y}}{2}}$$

represents the second transformation ratio.p*

$$\log \frac{p}{\frac{p + \hat{y}}{2}}$$

represents the first sub-loss, and $$\hat{y} * \log \frac{\hat{y}}{\frac{p + \hat{y}}{2}}$$

represents the second sub-loss.

In this embodiment, the label counting information is obtained by counting the current mapping label and the target prediction label, the logarithmic transformation is performed on the ratio of the label counting information to the target prediction label to obtain the first transformation ratio, the logarithmic transformation is performed on the ratio of the label counting information to the current mapping label to obtain the second transformation ratio, the target prediction label and the first transformation ratio are fused to obtain the first sub-loss, the second transformation ratio and the current mapping label are fused to obtain the second sub-loss, and the first loss may be quickly obtained based on the first sub-loss and the second sub-loss. The closer and more similar the current mapping label and the target prediction label are, the closer the first sub-loss and the second sub-loss are to zero, and then the closer the first loss is to zero.

In one embodiment, the step of acquiring a label distribution ratio corresponding to the training label, and obtaining a second loss based on the label distribution ratio and the target prediction label includes:

performing vectorization on the label distribution ratio to obtain a label distribution vector; and performing cross entropy calculation on the label distribution vector and the target prediction label to obtain the second loss.

The cross entropy calculation is a calculation method for measuring a distribution difference between two pieces of data. The closer the target prediction label and the label distribution vector are, the smaller the second loss is.

Specifically, the label distribution ratio is used for representing a comparative relationship between the quantities of training images of various label classes. In order to facilitate the calculation with the target prediction label, it is necessary to perform vectorization on the label distribution ratio to transform the label distribution ratio into the label distribution vector. Vector dimensions of the label distribution vector and the target prediction label are the same, and a quantity of vector dimensions of the label distribution vector is the quantity of label classes. The computer device may take ratios of the quantities of training images corresponding to various label classes to the total quantity of training images as vector values corresponding to various vector dimensions in the label distribution vector. For example, if the training label is a binary classification label and the label distribution ratio is 30:30=1:1, then the label distribution vector may be [½, ½], that is, [0.5, 0.5]. Further, the computer device may perform cross entropy calculation on the label distribution vector and the target prediction label to obtain the second loss. Specifically, the logarithmic transformation may be performed by taking a preset value as a base number and taking the target prediction label as a true number, the label distribution vector and the target prediction label after the logarithmic transformation are fused, and an opposite number of a fusion result is taken as the second loss.

In one embodiment, a calculation formula for the second loss is as follows:

$$L_p = P_{prior} * \log p$$

where, $L_p$ represents the second loss, $p_{prior}$ represents the label distribution vector, and p represents the target prediction label.

In this embodiment, vectorization is performed on the label distribution ratio to obtain the label distribution vector, and the second loss may be quickly obtained by performing cross entropy calculation on the label distribution ratio and the target prediction label. The second loss is used for characterizing a data difference between the target prediction label and the label distribution vector. The closer the target prediction label and the label distribution vector are, the smaller the second loss is.

In one embodiment, the step of obtaining the model feedback data based on the first loss and the second loss includes:

performing information entropy calculation on the target prediction label to obtain a third loss; and obtaining the model feedback data based on the first loss, the second loss, and the third loss.

The information entropy calculation is a calculation method for measuring an amount of information in data. The information entropy calculation performed on one piece of data is equivalent to cross entropy calculation performed on the data and itself. The closer the target prediction label and the current mapping label obtained by performing label encoding on the training label are, the smaller the third loss is.

Specifically, the third loss is used for constraining the first loss to avoid trapping the model into a local optimum. It is to be understood that, during updating of a network, since the information of a manually labeled label is also updated synchronously (that is, the current mapping label is also updated synchronously), and the purpose of network learning is to make a model output and the label information as close as possible. It is apparent that only manual label information needs to be updated to be completely consistent with the model output, and in this case, the first loss is equal to 0. However, the model output at this moment may be out of order, because the model parameters are randomly initialized at the beginning of training. Therefore, to avoid this case, the third loss is introduced. The third loss is taken as a positive term to constrain the first loss.

The computer device may perform information entropy calculation on the target prediction label to obtain the third loss. Specifically, the logarithmic transformation may be performed by taking a preset value as a base number and taking the target prediction label as a true number, the target prediction label and the target prediction label after the logarithmic transformation are fused, and an opposite number of a fusion result is taken as the third loss. An optimization direction of the third loss is to make the model output and the current mapping label obtained by performing label encoding on the training label as close as possible. In one embodiment, a calculation formula for the third loss is as follows:

$$L_e = -p * \log p$$

where, $L_e$ represents the third loss, and p represents the target prediction label.

In this embodiment, the third loss may be quickly obtained by performing the information entropy calculation on the target prediction label, and the model feedback data obtained based on the first loss, the second loss, and the third loss helps to ensure the training quality of the model.

In one embodiment, the step of obtaining the model feedback data based on the first loss, the second loss, and the third loss includes:

acquiring loss weights respectively corresponding to the first loss, the second loss, and the third loss, the loss weight corresponding to the second loss decreasing as a noise image ratio corresponding to noise images in the current training image set increases; and fusing the first loss, the second loss, and the third loss based on the loss weights to obtain the model feedback data.

The noise image refers to a training image with noise. The noise image is an image that it is difficult to determine an accurate label class corresponding thereto from a plurality of label classes, that is, the label accuracy of a training label corresponding to the noise image is lower than a preset accuracy. For example, the training label is a binary classification label, a positive label represents a normal image, and a negative training label represents a blooming image. For a slightly blooming or partially blooming image, it is difficult to determine an accurate label corresponding thereto, some people will label the image as corresponding to the positive label, and some people will label the image as corresponding to the negative label. Therefore, label labeling information of a plurality of users for the same training image may be collected, each piece of label labeling information is counted and analyzed, and the label accuracy corresponding to the training image is determined based on the counting analysis result. For example, a labeling ratio corresponding to each label class is calculated, the maximum labeling ratio is selected therefrom as the label accuracy, and a label class corresponding to the maximum labeling ratio is selected therefrom as the training label. The preset accuracy may be set as required, for example, set as 0.8. For example, for a training image A, the label labeling information given by 3 users is a positive label, the label labeling information given by 3 users is a negative label, a training label corresponding to the training image A is the positive label or the negative label, and the label accuracy is 3/6=0.5<0.8. Therefore, the training image A is a noise image.

The noise image ratio refers to a ratio of the quantity of noise images to the total quantity of training images in the current training image set. For example, in the current training image set, there are 100 training images, in which there are 20 noise images, and then the noise image ratio is 20/100=0.2.

Specifically, when the model feedback data is obtained based on the first loss, the second loss, and the third loss, the computer device may acquire loss weights respectively corresponding to the first loss, the second loss, and the third loss, and perform weighted fusion on each loss based on the loss weight corresponding to each loss, so as to obtain the model feedback data. Each loss weight may be a preset fixed value, or may also be used as a model parameter to adjust and learn during the model training.

Further, since the purpose of the second loss is to make the model output not too far from the label distribution ratio, if the ratio of the noise images to the training images is large, the loss weight corresponding to the second loss may be appropriately reduced to avoid a bad influence of the noise image on the model training. Therefore, the loss weight corresponding to the second loss may decrease as the noise image ratio corresponding to the noise images in the training images.

In one embodiment, a calculation formula for the model feedback data is as follows:

$$L=L_c+\alpha L_e+\beta L_p$$

where, L represents the model feedback data (which may also be referred to as a loss function), $L_c$ represents the first loss, $L_p$ represents the second loss, and $L_e$ represents the third loss. The loss weight corresponding to the first loss is 1, the loss weight corresponding to the second loss is $\beta$, and the loss weight corresponding to the third loss is $\alpha$. $\alpha$ decreases as the noise image ratio corresponding to the noise images in the current training image set increases.

In this embodiment, the loss weights respectively corresponding to the first loss, the second loss, and the third loss are acquired, and the first loss, the second loss, and the third loss are fused to obtain the model feedback data based on the loss weights. The loss weight corresponding to the second loss decreases as the noise image ratio of the noise images in the training images increases, thereby preventing the second loss from affecting the training effect of the model training when there are many noise data.

In one embodiment, the step of generating a label loss based on data change reference information corresponding to the model feedback data and adjusting the current mapping label based on the label loss to obtain an updated mapping label includes:

performing gradient calculation on the current mapping label based on the model feedback data to obtain the data change reference information; acquiring a model learning rate, and adjusting the data change reference information based on the model learning rate to obtain the label loss; and obtaining the updated mapping label based on a distance between the current mapping label and the label loss.

The model learning rate is a hyper-parameter, which may be a preset fixed value, or may also be used as a model parameter to adjust and learn during the model training.

Specifically, the computer device may calculate a gradient of the model feedback data to the current mapping label, and take a calculation result as the data change reference information, that is, perform gradient calculation on the current mapping label based on the model feedback data to obtain the data change reference information. It is to be understood that since the self-entropy loss is obtained based on the target prediction label and is independent of the current mapping label, even if the model feedback data includes the self-entropy loss, the data change reference information obtained by performing the gradient calculation on the current mapping label based on the model feedback data will not be affected by the self-entropy loss. Then, the computer device may acquire the model learning rate, and fuse the model learning rate and the data change reference information to obtain the label loss. For example, a product of the model learning rate and the data change reference information is taken as the label loss, and a weighted product of the model learning rate and the data change reference information is taken as the label loss. Then, the computer device calculates the distance between the current mapping label and the label loss, and takes the calculated distance as an updated mapping label. For example, a difference value between the current mapping label and the label loss is taken as the updated mapping label. Subsequently, the updated mapping label is taken as a new current mapping label to participate in the next round of model iterative training.

In one embodiment, the current mapping label may be adjusted by the following formulas:

$$\hat{y}_{t+1} = \hat{y}_L - l_r * \hat{y}_t \cdot \text{grad}$$

$$\hat{y}_t \cdot \text{grad} = \frac{\partial L}{\partial \hat{y}_t}$$

where, $\hat{y}_t \cdot \text{grad}$ represents the data change reference information and is obtained by calculating a gradient of a loss function L to $\hat{y}_t$, L represents the model feedback data (which may also be referred to as the loss function), $\hat{y}_t$ represents a current mapping label corresponding to time t (a t-th round of model iteration), $\hat{y}_{t+1}$ represents a current mapping label corresponding to time t+1 (a (t+1)-th round of model iteration), that is, the updated mapping label obtained by adjusting the current mapping label, and $l_r$ represents the model learning rate.

In this embodiment, gradient calculation is performed on the current mapping label based on the model feedback data to obtain the data change reference information, the data change reference information is adjusted based on the model learning rate to obtain the label loss, and the updated mapping label is obtained based on the distance between the current mapping label and the label loss. In this way, the current mapping label is adjusted based on the loss gradient of the model feedback data to the current mapping label, and the current mapping label may be updated in a gradient descent direction, so that the target mapping label can be quickly obtained by adjusting the current mapping label.

In one embodiment, as shown in FIG. 4, the step of adjusting model parameters of the initial image abnormality detection model based on the model feedback data to obtain an updated image abnormality detection model, taking the updated image abnormality detection model as the initial image abnormality detection model, acquiring a next training image set as the current training image set, and returning to perform the step of inputting a training image in a current training image set into an initial image abnormality detection model until a training end condition is satisfied to obtain a target image abnormality detection model includes the following steps:

Step S402: Adjust model parameters of the initial image abnormality detection model based on the model feedback data to obtain an updated image abnormality detection model, take the updated image abnormality detection model as the initial image abnormality detection model, acquire a next training image set as the current training image set, and return to perform the step of inputting a training image in a current training image set into an initial image abnormality detection model until a second convergence condition is satisfied to obtain an intermediate image abnormality detection model and a target mapping label.

The intermediate image abnormality detection model is a model finally obtained by synchronously adjusting the model parameters and the current mapping label during the model training. The target mapping label is a mapping label finally obtained by synchronously adjusting the model parameters and the current mapping label during the model training, and may be considered as a mapping label obtained after the initial image abnormality detection model converges.

It is to be understood that the initial image abnormality detection model may be obtained by either direct initialization or pre-training. For example, a candidate image abnormality detection model is directly acquired as the initial image abnormality detection model. The candidate image abnormality detection model is pre-trained, the trained candidate image abnormality detection model is taken as the initial image abnormality detection model, and the like.

Specifically, during training of the initial image abnormality detection model, the computer device may simultaneously update the model parameters and the current mapping label. The computer device may perform back propagation based on the model feedback data to adjust the model parameters of the initial image abnormality detection model to obtain a new initial image abnormality detection model, input the training image in the next training image set into the new initial image abnormality detection model to obtain a new target prediction label, obtain new model feedback data based on the new current mapping label and the new target prediction label, and readjust the current mapping label and the model parameters based on the new model feedback data. By analogy, a plurality of rounds of iterative training are circulated until the second convergence condition is satisfied to obtain the intermediate image abnormality detection model and the target mapping label. The second convergence condition may be at least one of the following: the number of model iterations reaching a second number of iterations, a numerical value of the model feedback data being less than a preset target numerical value, a change rate of the model feedback data being less than a preset change rate, the minimization of the model feedback data, and the like.

Step S404: Input a training image in a target training image set into the intermediate image abnormality detection model to obtain an updated prediction label corresponding to the training image.

Step S406: Generate an updated loss based on the updated prediction label corresponding to the training image in the target training image set and the target mapping label, and adjust model parameters of the intermediate image abnormality detection model based on the updated loss until a third convergence condition is satisfied to obtain a target image abnormality detection model.

The target training image set refers to a training image set for training the intermediate image abnormality detection model, and the target training image set may include at least one training image. The target training image set and the current training image set may be the same training image set, or may be different training image sets, that is, the target training image set and the current training image set may include the same training image, or may also include different training images.

Specifically, after obtaining the intermediate image abnormality detection model, the computer device may fix the target mapping label, perform further model training on the intermediate image abnormality detection model, and finely adjust the model parameters to obtain the target image abnormality detection model. During training of the intermediate image abnormality detection model, the computer device may input the training image into the intermediate image abnormality detection model to obtain an updated prediction label corresponding to the training image, generate an updated loss based on a data distribution difference between the updated prediction label and the target mapping label, and perform back propagation based on the updated loss to adjust the model parameters of the intermediate image abnormality detection model until the third convergence condition is satisfied to obtain the target image abnormality detection model. The third convergence condition may be at least one of the following: the number of model iterations reaching a third number of iterations, a numerical value of the updated loss being less than a preset updated numerical value, and the like.

It is to be understood that, similar to the model feedback data, the updated loss may be obtained based on at least one loss. For example, the updated loss includes a classification loss calculated based on the target mapping label and the updated prediction label, and a priori loss calculated based on the training label and the updated prediction label. The updated loss includes a classification loss calculated based on the target mapping label and the updated prediction label, a priori loss calculated based on the training label and the updated prediction label, and a self-entropy loss calculated based on the updated prediction label. The calculation of various losses may refer to the methods described in various related embodiments above, which will not be described in detail herein.

In this embodiment, during training of the initial image abnormality detection model, the current mapping label and the model parameters are synchronously updated until the second convergence condition is satisfied to obtain the intermediate image abnormality detection model and the target mapping label, and then the target mapping label is fixed to further update the model parameters of the intermediate image abnormality detection model until the third convergence condition is satisfied to obtain the target image abnormality detection model. The above training process may further improve the accuracy of model training.

In one embodiment, the step of generating an updated loss based on the updated prediction label and the target mapping label includes:

performing divergence calculation on the updated prediction label and the target mapping label to obtain a fourth loss; performing information entropy calculation on the updated prediction label to obtain a fifth loss; performing cross entropy calculation based on the training label and the updated prediction label corresponding to the target training image set to obtain a sixth loss; and obtaining the updated loss based on the fourth loss, the fifth loss, and the sixth loss.

Specifically, the updated loss may be obtained based on the classification loss, the priori loss, and the self-entropy loss. The classification loss may be obtained by performing divergence calculation on the updated prediction label corresponding to each training image in the target training image set and the target mapping label, that is, the computer device may perform divergence calculation on the updated prediction label and the target mapping label to obtain the fourth loss. The priori loss may be obtained by performing information entropy calculation on the updated prediction label corresponding to each training image in the target training image set, that is, the computer device may perform the information entropy calculation on the updated prediction label to obtain the fifth loss. The priori loss may be obtained by performing the cross entropy calculation on the training label and the updated prediction label corresponding to each training image in the target training image set, that is, the computer device may perform the cross entropy calculation based on the training label and the updated prediction label to obtain the sixth loss. Finally, the computer device may obtain the updated loss based on the fourth loss, the fifth loss, and the sixth loss. For example, the fourth loss, the fifth loss, and the sixth loss are added to obtain the updated loss, and weighted fusion is performed on the fourth loss, the fifth loss, and the sixth loss to obtain the updated loss. Specific calculation processes of various losses may refer to the methods described in various related embodiments above, which will not be described in detail herein.

In this embodiment, the fourth loss is obtained by performing divergence calculation on the updated prediction label and the target mapping label, the fifth loss is obtained by performing the information entropy calculation on the updated prediction label, the sixth loss is obtained by performing the cross entropy calculation based on the training label and the updated prediction label corresponding to the target training image set, and the updated loss is obtained based on the fourth loss, the fifth loss, and the sixth loss. The updated loss is composed of many different types of losses, and the accuracy of model training may be improved by training the model by adjusting the model parameters based on such updated loss.

In one embodiment, as shown in FIG. 5, an image abnormality detection method is provided, which is described by taking an example in which the method is applied to the computer in FIG. 1. It is to be understood that the computer device may be either the terminal 102 or the server 104. In this embodiment, the image abnormality detection method includes the following steps:

Step S502: Acquire an image to be detected.

Step S504: Input the image to be detected into a target image abnormality detection model to obtain a model prediction label corresponding to the image to be detected.

The image to be detected refers to an image to be detected for abnormality. The image to be detected may be a picture or a video frame in a video. The model prediction label refers to a prediction label corresponding to the image to be detected.

Specifically, the computer device may acquire the image to be detected and the target image abnormality detection model locally or from another terminal or server, and input the image to be detected into the target image abnormality detection model to obtain the model prediction label corresponding to the image to be detected.

A training process of the target image abnormality detection model includes: acquiring an initial mapping label corresponding to a training label, and taking the initial mapping label as a current mapping label; inputting a training image in a current training image set into an initial image abnormality detection model to obtain a target prediction label corresponding to the training image; generating model feedback data based on the current mapping label corresponding to the training label and the target prediction label of the training image; generating a label loss based on data change reference information corresponding to the model feedback data, adjusting the current mapping label based on the label loss to obtain an updated mapping label, and taking the updated mapping label as the current mapping label; and adjusting model parameters of the initial image abnormality detection model based on the model feedback data to obtain an updated image abnormality detection model, taking the updated image abnormality detection model as the initial image abnormality detection model, acquiring a next training image set as the current training image set, and returning to perform the step of inputting a training image in a current training image set into an initial image abnormality detection model until a training end condition is satisfied to obtain a target image abnormality detection model.

It is to be understood that a specific training process of the target image abnormality detection model may refer to the methods described in the various related embodiments in the image abnormality detection model training method, which will not be described in detail herein.

Step S506: Determine an image abnormality detection result corresponding to the image to be detected based on the model prediction label.

Specifically, after obtaining the model prediction label, the computer device may determine the image abnormality detection result corresponding to the image to be detected based on the model prediction label. The computer device may set the target image abnormality detection model to output complete data, that is, the model prediction label is a prediction vector, and each vector value in the prediction vector represents the probability that the image to be detected belongs to a corresponding label class. The computer device may take the probability corresponding to a normal label class in the prediction vector as a target confidence, determine the image to be detected as a normal image and an image abnormality detection result of the image to be detected as that the image does not have an abnormality if the target confidence is greater than a preset confidence, and determine the image to be detected as an abnormal image and an image abnormality detection result of the image to be detected as that the image is abnormal if the target confidence is less than or equal to the preset confidence. If the model prediction label is a prediction vector, the computer device may also take a vector value greater than a preset vector value in the prediction vector as a target confidence, and determine the image abnormality detection result of the image to be detected as a label class corresponding to the target confidence if the target confidence is greater than the preset confidence.

Of course, the computer device may also set the target image abnormality detection model to output only the probability corresponding to the normal label class as the model prediction label, determine that the image to be detected as a normal image if the model prediction label is greater than the preset confidence, and determine that the image to be detected is an abnormal image if the model prediction label is less than or equal to the preset confidence. The preset confidence may be set as required, for example, set as 0.5.

The image abnormality detection method of this disclosure may be applied to a quality analysis task of an image or a video. For example, in a social application, the computer device acquires a picture to be shared uploaded by a user, and performs image abnormality detection on the picture to be shared based on the target image abnormality detection model, determines that the picture to be shared satisfies a sharing condition if an image abnormality detection result is that the image does not have an abnormality, then publishes the picture to be shared in the social application for other users to browse, and may prompt the user that the picture quality is poor and prompt the user to re-upload the picture if the image abnormality detection result is that the image is abnormal. In a video application, the computer device acquires a video to be shared uploaded by a user, performs image abnormality detection on a video frame in the video to be shared based on the target image abnormality detection model, determines that the video to be shared satisfies a sharing condition if an image abnormality detection result is that a ratio of video frames without an image abnormality is greater than a preset ratio, and then publishes the video to be shared in the video application for other users to browse. In a vehicle surrounding environment detection application, the computer device may acquire a surrounding environment video collected by an in-vehicle terminal, perform image abnormality detection on a video frame in the surrounding environment video based on the target image abnormality detection model, store the surrounding environment video or perform further data analysis on the surrounding environment video to determine an environment state where the vehicle is located if an image abnormality detection result is that a ratio of video frames without an image abnormality is greater than a preset ratio, and instruct the in-vehicle terminal to re-collect the surrounding environment video if the image abnormality detection result is that the ratio of the video frames without an image abnormality is less than or equal to the preset ratio.

In the above image abnormality detection method, an initial mapping label corresponding to a training label is acquired, and the initial mapping label is taken as a current mapping label; a training image in a current training image set is input into an initial image abnormality detection model to obtain a target prediction label corresponding to the training image; model feedback data is generated based on the current mapping label corresponding to the training label and the target prediction label of the training image; a label loss is generated based on data change reference information corresponding to the model feedback data, the current mapping label is adjusted based on the label loss to obtain an updated mapping label, and the updated mapping label is taken as the current mapping label; and model parameters of the initial image abnormality detection model are adjusted based on the model feedback data to obtain an updated image abnormality detection model, the updated image abnormality detection model is taken as the initial image abnormality detection model, a next training image set is acquired as the current training image set, and the step of inputting a training image in a current training image set into an initial image abnormality detection model is returned to perform until a training end condition is satisfied to obtain a target image abnormality detection model. In this way, the current mapping label and the model parameters are adjusted synchronously during model training, and the current mapping label corresponding to the noise-containing training label is self-corrected by using the feature learning ability of the model, which can effectively filter the influence of noise data on the performance of the model, greatly improve the performance of the model, and finally train to obtain an image abnormality detection model with high accuracy. Therefore, during model application, an image abnormality detection result with high accuracy may be obtained by performing image abnormality detection on the image to be detected based on the image abnormality detection model with high accuracy, which effectively improves the detection accuracy and the detection efficiency of image abnormality detection.

In one specific embodiment, the above image abnormality detection model training method and image abnormality detection method may be applied to an image blooming detection task. Image blooming detection refers to detection for determining whether a picture has a blooming phenomenon. The image blooming detection task is a necessary step in quality analysis of a picture and a video, and may be used for evaluating the quality of the current picture or video.

Referring to FIG. 6, a blooming image is not a simple binary classification, and many blooming images are only slightly blooming or partially blooming. Therefore, a simple binary label may have human subjectivity, which results in that manually labeled information corresponding to such a blooming image has noise, and the performance of the model will be reduced by performing model training in such a noise-containing label. By the image abnormality detection model training method of this disclosure, noise-containing manual label data may be distinguished and corrected by using the feature learning ability of the model, so that the performance of the model is greatly improved, and the finally trained model may output a more accurate prediction result in a blooming detection task.

Referring to FIG. 7, during model training, an image is input into an image blooming detection model, and a prediction probability (that is, a prediction label) of whether the input image is blooming may be obtained through data calculation of a deep learning model. Meanwhile, a manual label corresponding to the input image is transformed into a mapping label through label encoding. The manual label refers to a manually labeled label, which may be a 0/1 binary label, and represents an artificial determination result of the presence or absence of blooming in an image. A loss function of the image blooming detection model includes three losses, specifically a self-entropy loss, a classification loss, and a priori loss. The self-entropy loss is calculated based on the prediction probability, and is an entropy value result of the prediction probability and itself. The loss is a regular term to prevent trapping the model into local optimum. The classification loss is obtained based on the prediction probability and the mapping label and used for measuring a distance between the prediction probability of the model and the manual label. The priori loss is obtained based on the prediction probability and a distribution ratio of positive and negative labels in manual labels. The loss is also a regular term. After three losses are superposed, the parameter updating of the deep learning model and the label updating of the mapping label corresponding to the manual label are guided simultaneously, and the updated mapping label is also used as the calculation data corresponding to the loss function of the next round of model iteration. After a plurality of rounds of model iterations, a trained image blooming detection model and a corrected manual label result (that is, the target mapping label) are finally obtained.

It is to be understood that solid arrows in FIG. 7 represent a forward propagation process of the model, that is, an inference process, and dashed arrows in FIG. 7 represent a back propagation process during model training.

Further, a training process of the model may be divided into three steps. In step 1, an original manually labeled label is used for training, and the label is not updated. The purpose of this step is that model parameters are randomly initialized in an initial stage of model training, it is difficult to update the model parameters and a label distribution at the same time, and there may be instability in training. Therefore, initially, the mapping label is fixed, only the model parameters are updated, and the loss function of this stage may only include a classification loss. The model may be trained for K1 rounds of iterations in this stage. In step 2, the model parameters and the mapping label are updated simultaneously. The loss function of this stage may include three losses. The model may be trained for K2 rounds of iterations in this stage. In step 3, the mapping label obtained in the previous iteration of step 2 is fixed, and only the model parameters are updated without updating the mapping label. The model is updated by K3 rounds of iterations. The loss function of this stage includes three losses. Finally, K1+K2+K3 rounds of iterations need to be consumed in the whole training process. The trained image blooming detection model is obtained after the training.

It is to be understood that a three-step training mode of K1+K2+K3 may also be not used in the training process of the model. For example, a training mode of K1+K2 is used.

The trained image blooming detection model may be configured to predict the blooming probability of the input image (that is, a blooming confidence). Referring to FIG. 8, when the blooming confidence predicted by the model is greater than a preset confidence, it is determined that the input image has blooming and is a blooming image. When the blooming confidence predicted by the model is less than or equal to the preset confidence, it is determined that the input image does not have blooming and is a normal image. A preset threshold value may be set as required, for example, set as 0.5.

In this embodiment, a blooming degree of an image may be accurately detected based on the trained image blooming detection model. During model training, a noise-containing manual label is self-corrected to effectively filter the influence of noise data on the performance of the model, so that an accurate image blooming detection model is obtained by training. During model application, a stable and reliable blooming detection result may be output based on the accurate image blooming detection model, so as to provide a reliable technical support for video quality evaluation.

It is to be understood that the above model training method may be applied to an image abnormality detection model, such as an image blurring detection model and an image mosaic detection model, in addition to the image blooming detection model.

It is to be understood that although various steps in the flowcharts of FIG. 2 to FIG. 5 are shown in order as indicated by the arrows, these steps are not necessarily performed in order as indicated by the arrows. Unless explicitly stated herein, there is no strict order restriction on the performing of these steps, and these steps may be performed in another order. In addition, at least part of the steps in FIG. 2 to FIG. 5 may include a plurality of steps or a plurality of stages. These steps or stages are not necessarily performed at the same time, but may be performed at different times. These steps or stages are not necessarily performed in order, but may be performed in turn or alternately with other steps or at least part of the steps or stages of other steps.

In one embodiment, as shown in FIG. 9, an image abnormality detection model training apparatus is provided. The apparatus may use a software module or a hardware module, or a combination of the two to form a part of a computer device. The apparatus specifically includes: a training data acquisition module 902, a model prediction module 904, a model feedback data determination module 906, a label adjustment module 908, and a model adjustment module 910.

The training data acquisition module 902 is configured to acquire an initial mapping label corresponding to a training label, and take the initial mapping label as a current mapping label.

The model prediction module 904 is configured to input a training image in a current training image set into an initial image abnormality detection model to obtain a target prediction label corresponding to the training image.

The model feedback data determination module 906 is configured to generate model feedback data based on the current mapping label corresponding to the training label and the target prediction label of the training image.

The label adjustment module 908 is configured to generate a label loss based on data change reference information corresponding to the model feedback data, adjust the current mapping label based on the label loss to obtain an updated mapping label, and take the updated mapping label as the current mapping label.

The model adjustment module 910 is configured to adjust model parameters of the initial image abnormality detection model based on the model feedback data to obtain an updated image abnormality detection model, take the updated image abnormality detection model as the initial image abnormality detection model, acquire a next training image set as a current training image set, and return to perform the step of inputting a training image in a current training image set into an initial image abnormality detection model until a training end condition is satisfied to obtain a target image abnormality detection model.

In one embodiment, the training data acquisition module is further configured to perform label encoding on the training label based on a quantity of label classes corresponding to the training label, so as to obtain the initial mapping label.

In one embodiment, the image abnormality detection model training apparatus further includes:

a model pre-training module, configured to input a training image in a candidate training image set into a candidate image abnormality detection model to obtain an initial prediction label corresponding to the training image, and adjust model parameters of the candidate image abnormality detection model based on a label difference between the training label and the initial prediction label corresponding to the training image in the candidate training image set until a first convergence condition is satisfied to obtain an initial image abnormality detection model.

In one embodiment, the model feedback data determination module includes:

a first loss determination unit, configured to perform divergence calculation on the current mapping label and the target prediction label to obtain a first loss;

a second loss determination unit, configured to acquire a label distribution ratio corresponding to the training label, and obtain a second loss based on the label distribution ratio and the target prediction label, the label distribution ratio being determined based on a quantity of training images, respectively corresponding to each label class, in the current training image set; and the model feedback data determination unit, configured to obtain the model feedback data based on the first loss and the second loss.

In one embodiment, the first loss determination unit is further configured to perform logarithmic transformation on a ratio of the current mapping label to the target prediction label to obtain a label transformation ratio; and fuse the label transformation ratio and the target prediction label to obtain the first loss.

In one embodiment, the first loss determination unit is further configured to count the current mapping label and the target prediction label to obtain label counting information; perform logarithmic transformation on a ratio of the label counting information to the target prediction label to obtain a first transformation ratio, and perform logarithmic transformation on a ratio of the label counting information to the current mapping label to obtain a second transformation ratio; fuse the target prediction label and the first transformation ratio to obtain a first sub-loss, and fuse the current mapping label and the second transformation ratio to obtain a second sub-loss; and obtain the first loss based on the first sub-loss and the second sub-loss.

In one embodiment, the second loss determination unit is further configured to perform vectorization on the label distribution ratio to obtain a label distribution vector; and perform cross entropy calculation on the label distribution vector and the target prediction label to obtain the second loss.

In one embodiment, the model feedback data determination unit is further configured to perform information entropy calculation on the target prediction label to obtain a third loss; and obtain the model feedback data based on the first loss, the second loss, and the third loss.

In one embodiment, the model feedback data determination unit is further configured to acquire loss weights respectively corresponding to the first loss, the second loss, and the third loss, the loss weight corresponding to the second loss decreasing as a noise image ratio corresponding to noise images in the current training image set increases; and fuse the first loss, the second loss, and the third loss based on the loss weights to obtain the model feedback data.

In one embodiment, the label adjustment module is further configured to perform gradient calculation on the current mapping label based on the model feedback data to obtain the data change reference information; acquire a model learning rate, and adjust the data change reference information based on the model learning rate to obtain the label loss; and obtain the updated current mapping label based on a distance between the current mapping label and the label loss.

In one embodiment, the model adjustment module includes:

a first adjustment unit, configured to adjust the model parameters of the initial image abnormality detection model based on the model feedback data to obtain the updated image abnormality detection model, take the updated image abnormality detection model as the initial image abnormality detection model, acquire the next training image set as the current training image set, and return to perform the step of inputting a training image in a current training image set into an initial image abnormality detection model until a second convergence condition is satisfied to obtain an intermediate image abnormality detection model and a target mapping label;

a prediction unit, configured to input a training image in a target training image set into the intermediate image abnormality detection model to obtain an updated prediction label corresponding to the training image; and a second adjustment unit, configured to generate an updated loss based on the updated prediction label corresponding to the training image in the target training image set and the target mapping label, and adjust model parameters of the intermediate image abnormality detection model based on the updated loss until a third convergence condition is satisfied to obtain the target image abnormality detection model.

In one embodiment, the second adjustment unit is further configured to perform divergence calculation on the updated prediction label and the target mapping label to obtain a fourth loss; perform information entropy calculation on the updated prediction label to obtain a fifth loss; perform cross entropy calculation based on the training label and the updated prediction label corresponding to the target training image set to obtain a sixth loss; and obtain the updated loss based on the fourth loss, the fifth loss, and the sixth loss.

In one embodiment, the target image abnormality detection model is any one of an image blooming detection model, an image blurring detection model, and an image mosaic detection model.

The above image abnormality detection model training apparatus synchronously adjusts the training label and the current mapping label during model training, and self-corrects the current mapping label corresponding to the noise-containing training label by using the feature learning ability of the model, which can effectively filter the influence of noise data on the performance of the model, greatly improve the performance of the model, and finally train to obtain an image abnormality detection model with high accuracy. During subsequent model application, an image abnormality detection result with high accuracy may be obtained based on the image abnormality detection model with high accuracy, which effectively improves the detection accuracy and the detection efficiency of image abnormality detection.

Figure 10:
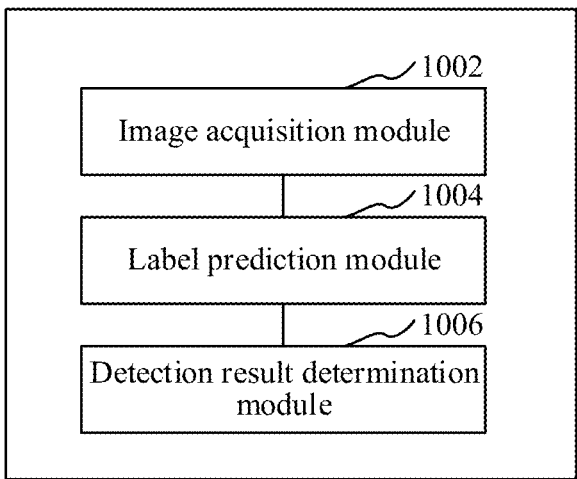
FIG. 10 is a structural block diagram of an image abnormality detection apparatus in one embodiment.

In one embodiment, as shown in FIG. 10, an image abnormality detection apparatus is provided. The apparatus may use a software module or a hardware module, or a combination of the two to form a part of a computer device. The apparatus specifically includes: an image acquisition module 1002, a label prediction module 1004, and a detection result determination module 1006.

The image acquisition module 1002 is configured to acquire an image to be detected.

The label prediction module 1004 is configured to input the image to be detected into a target image abnormality detection model to obtain a model prediction label corresponding to the image to be detected.

The detection result determination module 1006 is configured to determine an image abnormality detection result corresponding to the image to be detected based on the model prediction label.

A training process of the target image abnormality detection model includes:

acquiring an initial mapping label corresponding to a training label, and taking the initial mapping label as a current mapping label;

inputting a training image in a current training image set into an initial image abnormality detection model to obtain a target prediction label corresponding to the training image;

generating model feedback data based on the current mapping label corresponding to the training label and the target prediction label of the training image;

generating a label loss based on data change reference information corresponding to the model feedback data, adjusting the current mapping label based on the label loss to obtain an updated mapping label, and taking the updated mapping label as the current mapping label; and adjusting model parameters of the initial image abnormality detection model based on the model feedback data to obtain an updated image abnormality detection model, taking the updated image abnormality detection model as the initial image abnormality detection model, acquiring a next training image set as the current training image set, returning to perform the step of inputting a training image in a current training image set into an initial image abnormality detection model until a training end condition is satisfied to obtain a target image abnormality detection model.

The above image abnormality detection device synchronously adjusts the training label and the current mapping label during model training, and self-corrects the current mapping label corresponding to the noise-containing training label by using the feature learning ability of the model, which can effectively filter the influence of noise data on the performance of the model, greatly improve the performance of the model, and finally train to obtain an image abnormality detection model with high accuracy. Therefore, during model application, an image abnormality detection result with high accuracy may be obtained based on the image abnormality detection model with high accuracy, which effectively improves the detection accuracy and the detection efficiency of image abnormality detection.

Specific definitions of the image abnormality detection model training apparatus and the image abnormality detection apparatus may refer to the definitions of the image abnormality detection model training method and the image abnormality detection method above, which will not be described in detail herein. Various modules of the above image abnormality detection model training apparatus and the image abnormality detection apparatus may be completely or partially implemented by software, hardware, and combinations thereof. Each of the above modules may be embedded in or independent of a processor in a computer device in a hardware form, or may be stored in a memory in the computer device in a software form, so that the processor calls operations corresponding to the above modules.

Figure 11:
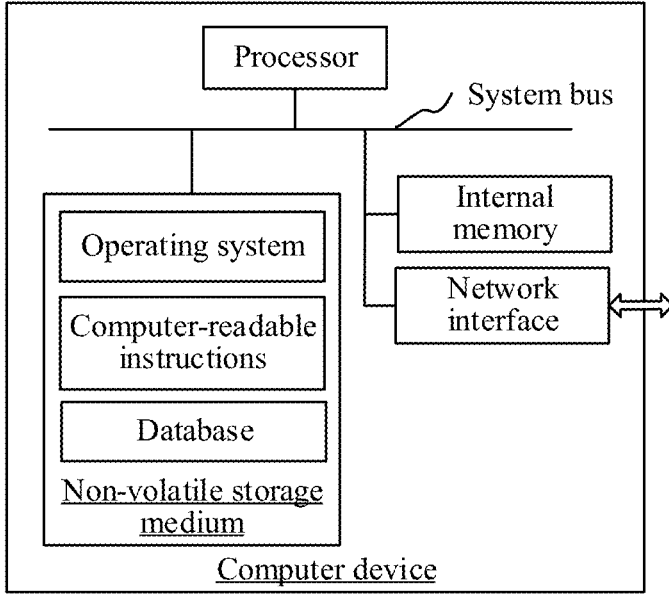
FIG. 11 is a diagram of an internal structure of a computer device in one embodiment.

In one embodiment, a computer device is provided. The computer device may be a server, and an internal structure diagram thereof may be as shown in FIG. 11. The computer device includes a processor (processing circuitry), a memory (a non-transitory computer-readable storage medium), and a network interface connected by a system bus. The processor of the computer device is configured to provide computing and control capabilities. The memory of the computer device includes a non-volatile storage medium and an internal memory. The non-volatile storage medium stores an operating system, computer-readable instructions, and a database. The internal memory provides an environment for the operation of the operating system and computer-readable instructions in the non-volatile storage medium. The database of the computer device is used for storing data such as a training image, a candidate image abnormality detection model, an initial image abnormality detection model, an intermediate image abnormality detection model, and a target image abnormality detection model. The network interface of the computer device is configured to connect and communicate with an external terminal through a network. The computer-readable instructions are executed by the processor to implement an image abnormality detection model training method or an image abnormality detection method.

Figure 12:
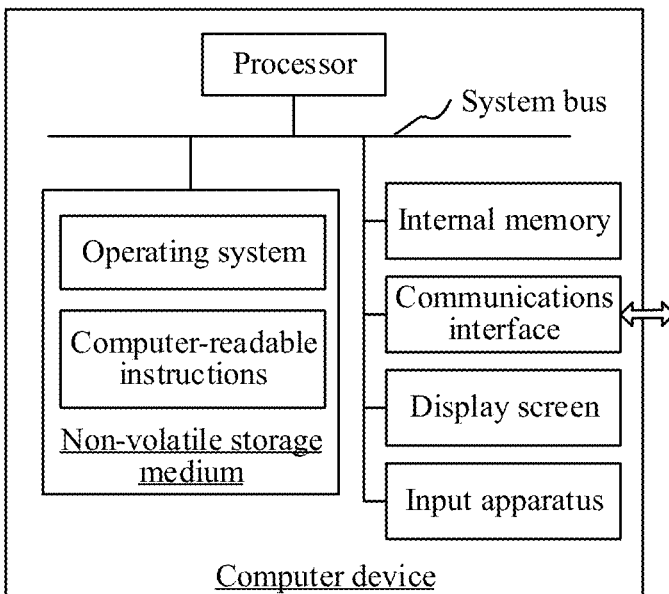
FIG. 12 is a diagram of an internal structure of a computer device in one embodiment.

In one embodiment, a computer device is provided. The computer device may be a terminal, and an internal structure diagram thereof may be as shown in FIG. 12. The computer device includes a processor, a memory, a communication interface, a display screen, and an input apparatus connected by a system bus. The processor of the computer device is configured to provide computing and control capabilities. The memory of the computer device includes a non-volatile storage medium and an internal memory. The non-volatile storage medium stores an operating system and computer-readable instructions. The internal memory provides an environment for the operation of the operating system and computer-readable instructions in the non-volatile storage medium. The communication interface of the computer device is configured to perform wired or wireless communication with an external terminal, and the wireless communication may be implemented through WIFI, a carrier network, near-field communication (NFC), or another technology. The computer-readable instructions are executed by the processor to implement an image abnormality detection model training method or an image abnormality detection method. The display screen of the computer device may be a liquid crystal display screen or an electronic ink display screen. The input apparatus of the computer device may be a touch layer covered on the display screen, may also be a key, a trackball or a touch pad arranged on a housing of the computer device, and may also be an external keyboard, touch pad, mouse, or the like.

It is to be understood by those skilled in the art that the structures shown in FIG. 11 and FIG. 12 are merely block diagrams of partial structures relevant to the solutions of this disclosure and do not constitute a limitation to the computer devices to which the solutions of this disclosure are applied, and a specific computer device may include more or less components than those shown in the figures, or combine some components, or have a different arrangement of components.

In one embodiment, a computer device is further provided, which includes a memory and one or more processors. The memory stores computer-readable instructions. The one or more processors execute the computer-readable instructions to implement the steps in various method embodiments described above.

In one embodiment, a computer-readable storage medium is provided, which stores computer-readable instructions. The computer-readable instructions are executed by one or more processors to implement the steps in various method embodiments described above.

In one embodiment, a computer program product or a computer program is provided. The computer program product or the computer program includes computer-readable instructions. The computer-readable instructions are stored in a computer-readable storage medium. One or more processors of a computer device read the computer-readable instructions from the computer-readable storage medium. The one or more processors, when executing the computer-readable instructions, enable the computer device to implement the steps in various method embodiments described above.

Those of ordinary skill in the art may understand that all or some processes in the above method embodiments may be implemented by computer-readable instructions instructing related hardware. The computer-readable instructions may be stored in a non-volatile computer-readable storage medium. When the computer-readable instructions are executed, the processes of various method embodiments as described above may be implemented. Any reference to a memory, storage, database, or another medium used in various embodiments provided by this disclosure may include at least one of non-volatile and volatile memories. The non-volatile memory may include a read-only memory (ROM), a magnetic tape, a floppy disk, a flash memory, an optical memory, or the like. The volatile memory may include a random access memory (RAM) or an external cache memory. By way of illustration and not limitation, the RAM may be in a variety of forms such as a static random access memory (SRAM) or a dynamic random access memory (DRAM).

The technical features of the above embodiments may be arbitrarily combined. For the sake of brevity of description, all possible combinations of the technical features in the above embodiments are not described. However, as long as there is no contradiction in the combination of these technical features, it is considered to be the range described in this specification.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. An image abnormality detection model training method, comprising:
   acquiring a noise-containing training label as a current mapping label of a training image in a current training image set;
   inputting the training image into an initial image abnormality detection model to obtain a prediction label corresponding to the training image;
   generating model feedback data based on least two of a first loss, a second loss, and a third loss, wherein the first loss is calculated based on a distance between the current mapping label corresponding to the training label and the prediction label of the training image, the second loss is calculated based on the prediction label and a label distribution ratio corresponding to the training label, and the third loss is calculated based on an information entropy calculation of the prediction label;

generating a label loss based on a data change of the model feedback data toward the current mapping label, adjusting the current mapping label based on the label loss to obtain an updated mapping label, and taking the updated mapping label as the current mapping label;
   adjusting model parameters of the initial image abnormality detection model based on the model feedback data to obtain an updated image abnormality detection model, taking the updated image abnormality detection model as the initial image abnormality detection model, acquiring a next training image set as the current training image set; and
   iteratively performing the inputting the training image, the generating the model feedback data, the generating the label loss, and the adjusting the model parameters until a training end condition is satisfied to obtain a trained image abnormality detection model.

2. The method according to claim 1, wherein the acquiring comprises:
   performing label encoding on the noise-containing training label to generate binary data.

3. The method according to claim 1, further comprising:
   inputting a candidate training image into a candidate image abnormality detection model to obtain an initial prediction label corresponding to the candidate training image; and
   adjusting model parameters of the candidate image abnormality detection model based on a label difference between a training label and the initial prediction label corresponding to the candidate training image until a first convergence condition is satisfied to obtain the initial image abnormality detection model.

4. The method according to claim 1, wherein the label distribution ratio is determined based on a quantity of training images, respectively corresponding to each label class, in the current training image set of the training image.

5. The method according to claim 4, wherein the first loss is obtained by performing divergence calculation comprising:
   performing logarithmic transformation on a ratio of the current mapping label to the prediction label to obtain a label transformation ratio; and
   fusing the label transformation ratio and the prediction label to obtain the first loss.

6. The method according to claim 4, wherein the first loss is obtained by performing divergence calculation comprising:
   combining the current mapping label and the prediction label to obtain label counting information;
   performing logarithmic transformation on a ratio of the label counting information to the prediction label to obtain a first transformation ratio, and performing logarithmic transformation on a ratio of the label counting information to the current mapping label to obtain a second transformation ratio;
   fusing the first transformation ratio and the prediction label to obtain a first sub-loss, and fusing the second transformation ratio and the current mapping label to obtain a second sub-loss; and
   obtaining the first loss based on the first sub-loss and the second sub-loss.

7. The method according to claim 4, wherein the second loss is obtained by:
   performing vectorization on the label distribution ratio to obtain a label distribution vector; and performing cross entropy calculation on the label distribution vector and the prediction label to obtain the second loss.

8. The method according to claim 1, wherein the generating the model feedback data, comprises:
   acquiring loss weights respectively corresponding to the first loss, the second loss, and the third loss, the loss weight corresponding to the second loss decreasing as a ratio of noise images to total images in the current training image set increases; and
   fusing the first loss, the second loss, and the third loss based on the loss weights to obtain the model feedback data.

9. The method according to claim 1, wherein the generating the label loss comprises:
   performing gradient calculation on the current mapping label based on the model feedback data to obtain the data change of the model feedback data;
   acquiring a model learning rate, and adjusting the data change based on the model learning rate to obtain the label loss; and
   obtaining the updated mapping label by modifying the current mapping label by the label loss.

10. The method according to claim 1, wherein the iteratively performing comprises:
   iteratively performing the inputting the training image, the generating the model feedback data, the generating the label loss, and the adjusting the model parameters until a second convergence condition is satisfied to obtain an intermediate image abnormality detection model and a fixed mapping label; and
   iteratively performing
      inputting a training image in a target training image set into the intermediate image abnormality detection model to obtain an updated prediction label corresponding to the training image,
      generating an updated loss based on the updated prediction label corresponding to the training image in the target training image set and the fixed mapping label, and
      adjusting model parameters of the intermediate image abnormality detection model based on the updated loss until a third convergence condition is satisfied to obtain the trained image abnormality detection model.

11. The method according to claim 10, wherein the generating the updated loss comprises:
   performing divergence calculation on the updated prediction label and the fixed mapping label to obtain a fourth loss;
   performing information entropy calculation on the updated prediction label to obtain a fifth loss;
   performing cross entropy calculation based on a training label corresponding to the target training image set and the updated prediction label to obtain a sixth loss; and
   obtaining the updated loss based on the fourth loss, the fifth loss, and the sixth loss.

12. The method according to claim 1, wherein the trained image abnormality detection model is any one of an image blooming detection model, an image blurring detection model, or an image mosaic detection model.

13. An image abnormality detection method, comprising:
   acquiring an image to be detected;
   inputting the image to be detected into a trained image abnormality detection model to obtain a model prediction label corresponding to the image to be detected; and determining an image abnormality detection result corresponding to the image to be detected based on the model prediction label,
wherein the trained image abnormality detection model is trained according to the image abnormality detection model training method of claim 1.

14. An image abnormality detection model training apparatus, comprising:
   processing circuitry configured to
      acquire a noise-containing training label as a current mapping label of a training image in a current training image set;
      input the training image into an initial image abnormality detection model to obtain a prediction label corresponding to the training image;
      generate model feedback data based on least two of a first loss, a second loss, and a third loss, wherein the first loss is calculated based on a distance between the current mapping label corresponding to the training label and the prediction label of the training image, the second loss is calculated based on the prediction label and a label distribution ratio corresponding to the training label, and the third loss is calculated based on an information entropy calculation of the prediction label;
      generate a label loss based on a data change of the model feedback data toward the current mapping label, adjust the current mapping label based on the label loss to obtain an updated mapping label, and take the updated mapping label as the current mapping label;
      adjust model parameters of the initial image abnormality detection model based on the model feedback data to obtain an updated image abnormality detection model, take the updated image abnormality detection model as the initial image abnormality detection model, acquire a next training image set as the current training image set; and
      iteratively input the training image in the current training image set, generate the model feedback data, generate the label loss, and adjust the model parameters until a training end condition is satisfied to obtain a trained image abnormality detection model.

15. The apparatus according to claim 14, wherein the processing circuitry is further configured to:
   perform label encoding on the noise-containing training label to generate binary data.

16. The apparatus according to claim 14, wherein the processing circuitry is further configured to:
   input a candidate training image into a candidate image abnormality detection model to obtain an initial prediction label corresponding to the candidate training image; and
   adjust model parameters of the candidate image abnormality detection model based on a label difference between a training label and the initial prediction label corresponding to the candidate training image until a first convergence condition is satisfied to obtain the initial image abnormality detection model.

17. The apparatus according to claim 14, wherein the processing circuitry is further configured to: determine the label distribution ratio based on a quantity of training images, respectively corresponding to each label class, in the current training image set of the training image.

18. The apparatus according to claim 17, wherein the processing circuitry is further configured to:

perform logarithmic transformation on a ratio of the current mapping label to the prediction label to obtain a label transformation ratio; and fuse the label transformation ratio and the prediction label to obtain the first loss.

19. A non-transitory computer-readable storage medium storing computer-readable instructions thereon, which, when executed by processing circuitry, cause the processing circuitry to perform an image abnormality detection model training method comprising:

acquiring a noise-containing training label as a current mapping label of a training image in a current training image set;

inputting the training image into an initial image abnormality detection model to obtain a prediction label corresponding to the training image;

generating model feedback data based on least two of a first loss, a second loss, and a third loss, wherein the first loss is calculated based on a distance between the current mapping label corresponding to the training label and the prediction label of the training image, the second loss is calculated based on the prediction label and a label distribution ratio corresponding to the training label, and the third loss is calculated based on an information entropy calculation of the prediction label;

generating a label loss based on a data change of the model feedback data toward the current mapping label, adjusting the current mapping label based on the label loss to obtain an updated mapping label, and taking the updated mapping label as the current mapping label;

adjusting model parameters of the initial image abnormality detection model based on the model feedback data to obtain an updated image abnormality detection model, taking the updated image abnormality detection model as the initial image abnormality detection model, acquiring a next training image set as the current training image set; and iteratively performing the inputting the training image, the generating the model feedback data, the generating the label loss, and the adjusting the model parameters until a training end condition is satisfied to obtain a trained image abnormality detection model.

* * * * *